(12) United States Patent
Song

(10) Patent No.: US 9,900,827 B2
(45) Date of Patent: Feb. 20, 2018

(54) METHOD AND APPARATUS FOR TRANSMITTING AND RECEIVING DATA IN WIRELESS COMMUNICATION SYSTEM

(71) Applicant: LG ELECTRONICS INC., Seoul (KR)

(72) Inventor: Jonghun Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/374,710

(22) Filed: Dec. 9, 2016

(65) Prior Publication Data

US 2017/0171798 A1    Jun. 15, 2017

Related U.S. Application Data

(60) Provisional application No. 62/265,428, filed on Dec. 10, 2015.

(51) Int. Cl.
| | | |
|---|---|---|
| H04B 7/00 | (2006.01) | |
| H04W 48/12 | (2009.01) | |
| H04W 4/00 | (2018.01) | |
| H04W 60/00 | (2009.01) | |
| H04W 84/18 | (2009.01) | |

(52) U.S. Cl.
CPC ........... *H04W 48/12* (2013.01); *H04W 4/008* (2013.01); *H04W 60/00* (2013.01); *H04W 84/18* (2013.01)

(58) Field of Classification Search
CPC ..... H04W 48/12; H04W 4/008; H04W 60/00; H04W 84/18
See application file for complete search history.

(56) References Cited

U.S. PATENT DOCUMENTS

| | | | | |
|---|---|---|---|---|
| 2013/0297422 | A1* | 11/2013 | Hunter | G06Q 30/0261 705/14.58 |
| 2016/0057553 | A1* | 2/2016 | Ryu | H04M 1/6066 340/4.41 |
| 2016/0100303 | A1* | 4/2016 | Kim | H04W 76/02 455/426.1 |
| 2017/0095735 | A1* | 4/2017 | Kondo | A63F 13/24 |

* cited by examiner

*Primary Examiner* — Xin Jia
(74) *Attorney, Agent, or Firm* — Birch, Stewart, Kolasch & Birch, LLP

(57) ABSTRACT

Disclosed are a method and apparatus for transmitting and receiving data using Bluetooth Low Energy technology in a wireless communication system. The method includes: establishing a Bluetooth LE connection with at least one device; opening a control path for the at least one device; and transmitting a control message associated with audio streaming to the at least one device via the control path, the opening of a control path including: sending to the at least one device a registration request message for registering the first device as a remote controller; and receiving a response message from the at least one device as a response to the registration request message.

2 Claims, 35 Drawing Sheets

[Fig.1]
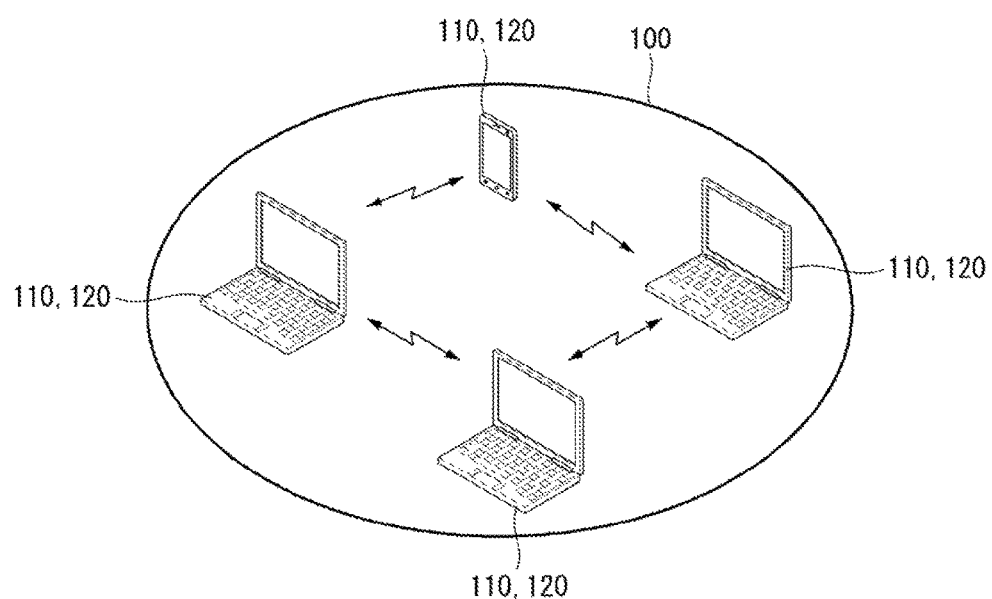

[Fig.2]
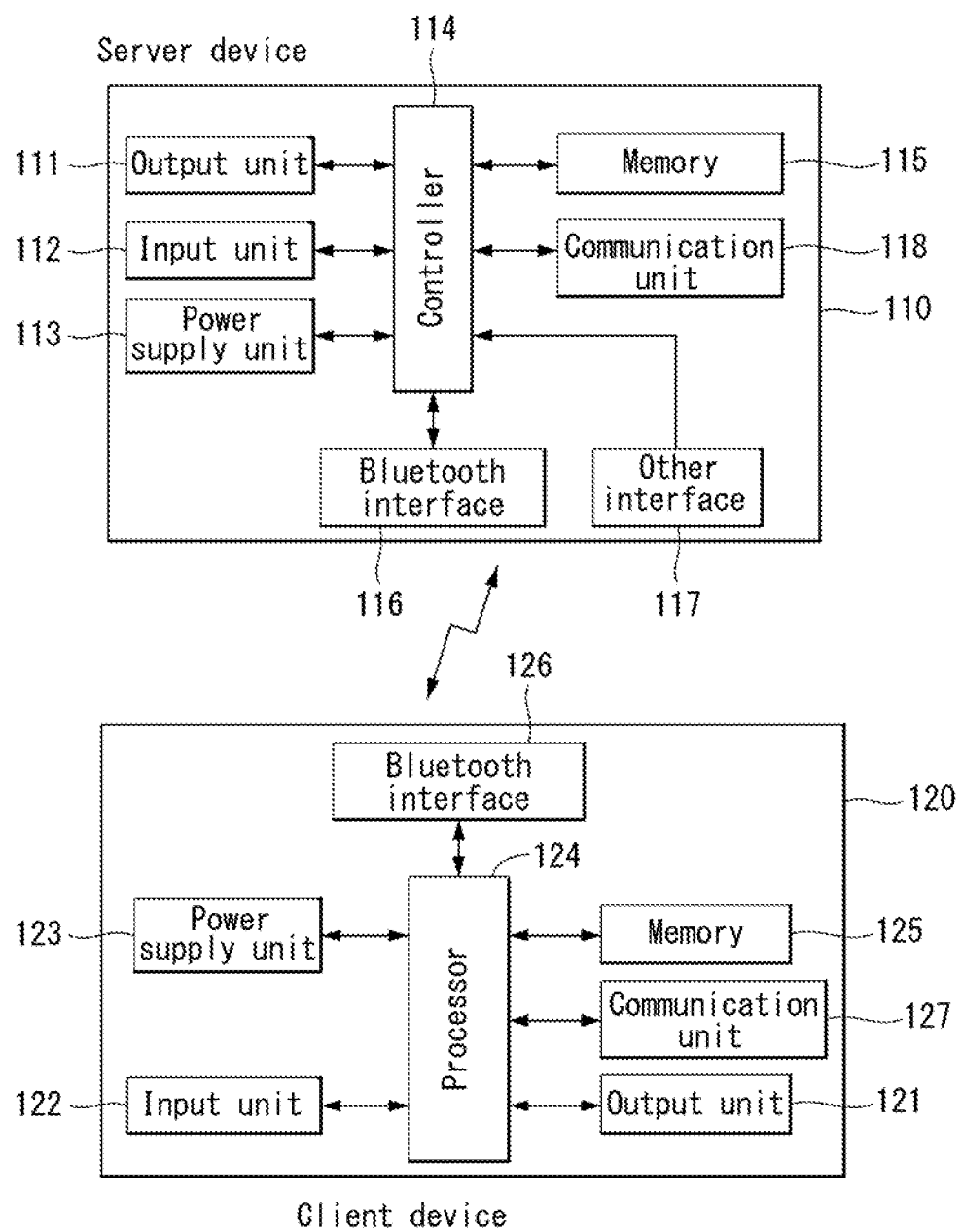

[Fig.3]
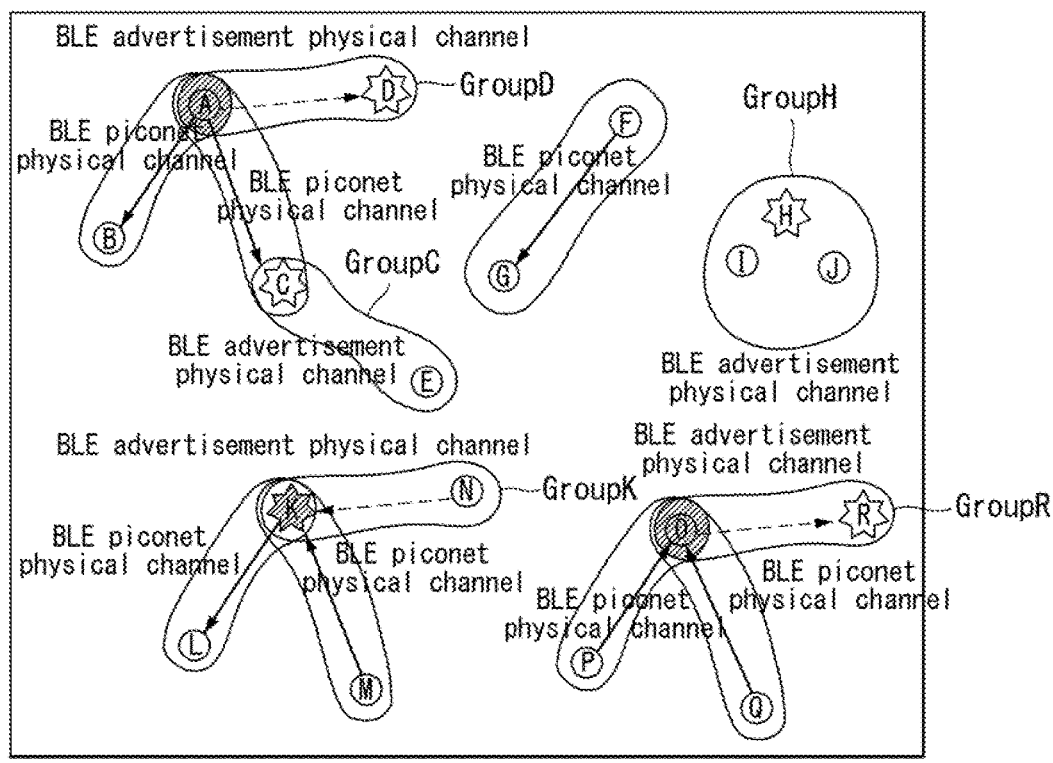

[Fig.4]
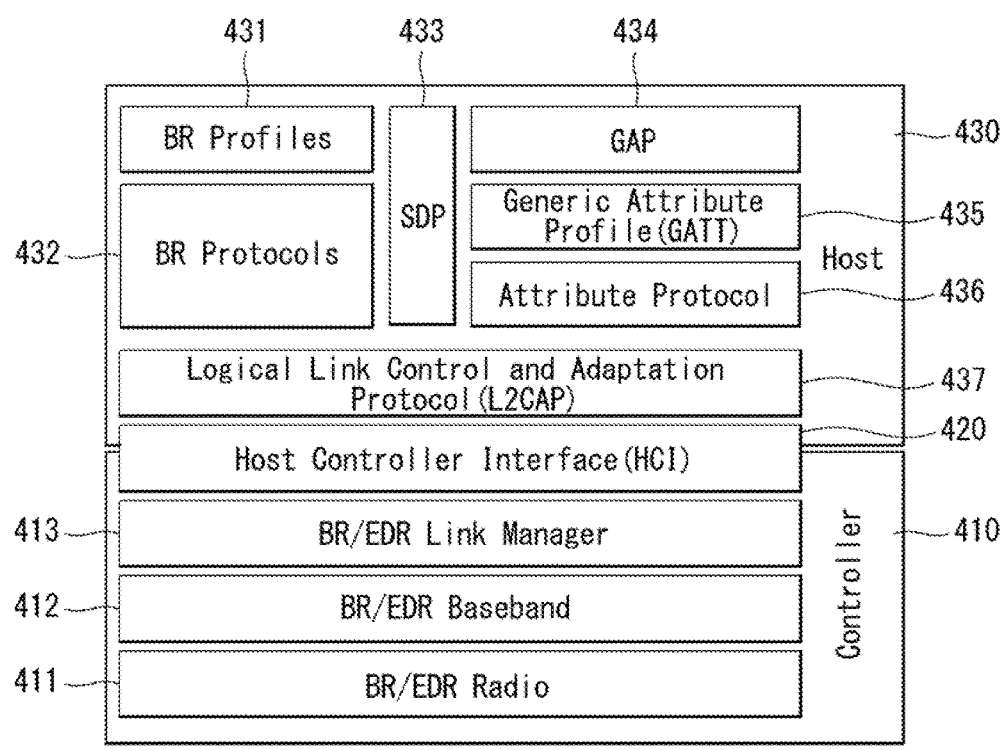

[Fig.5]
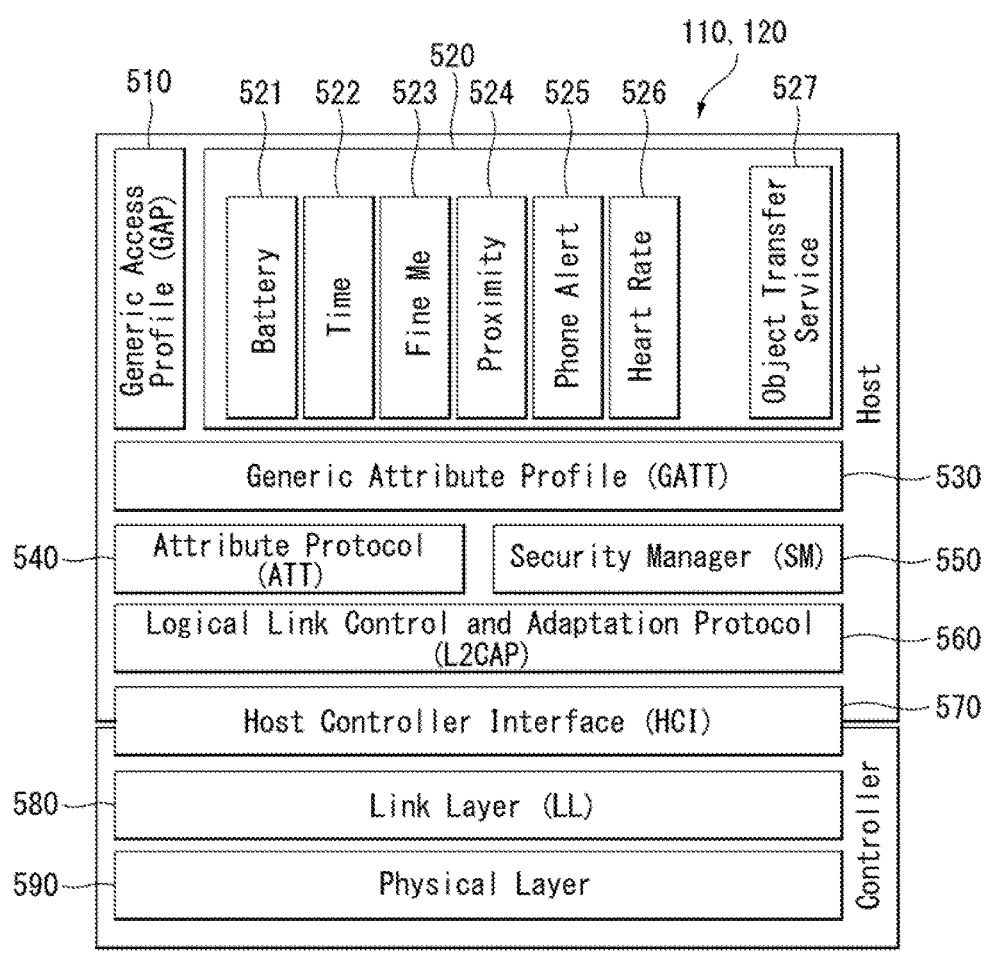

[Fig.6]
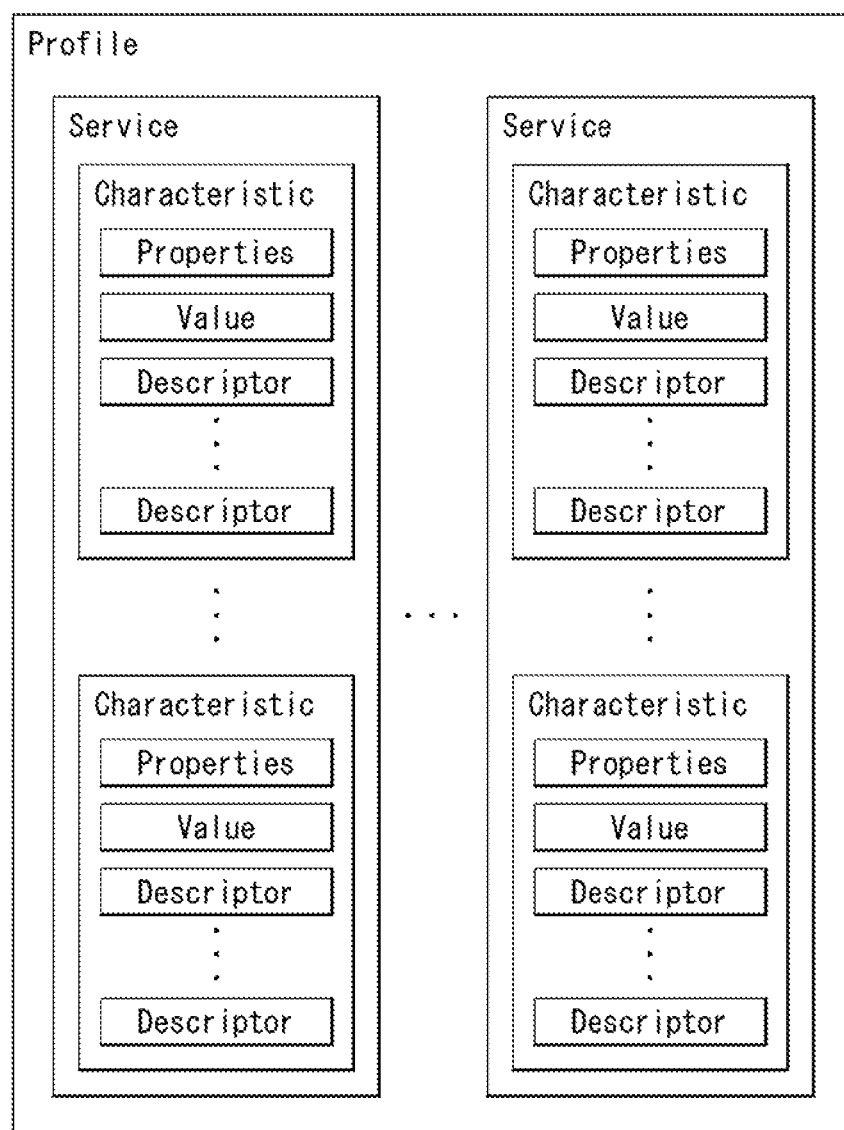

[Fig.7]
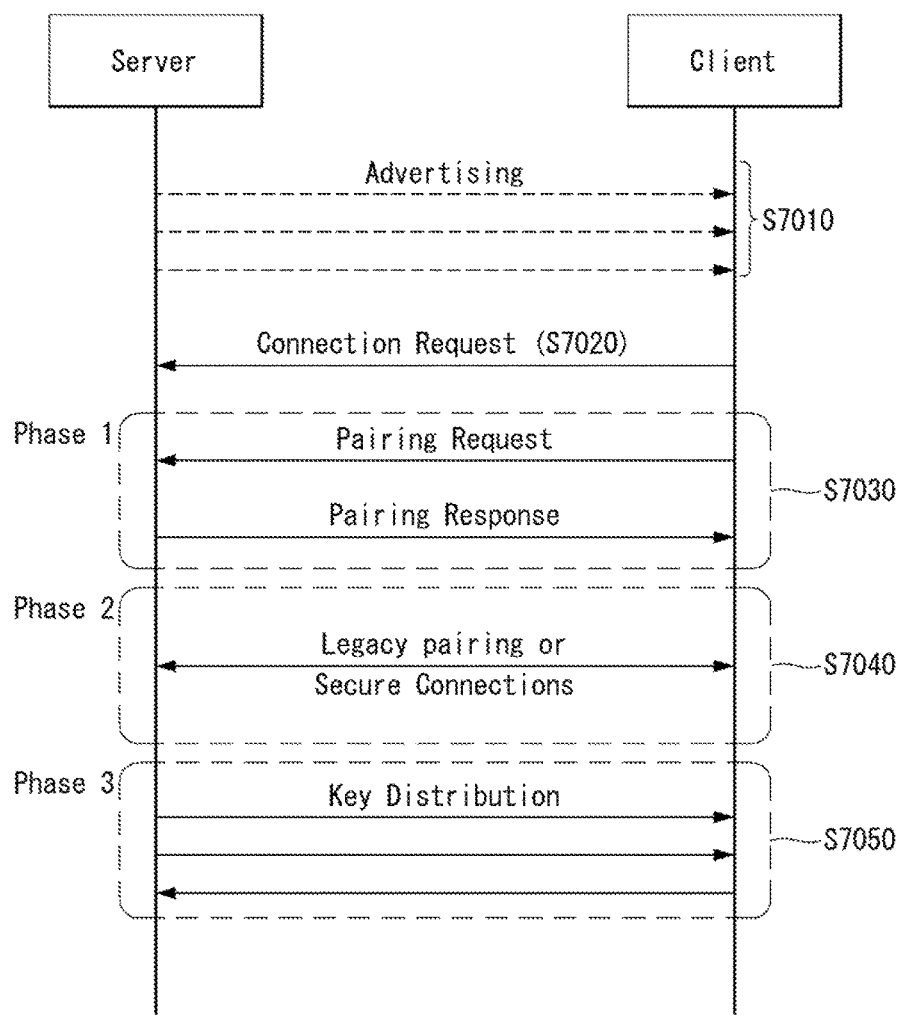

[Fig.8]
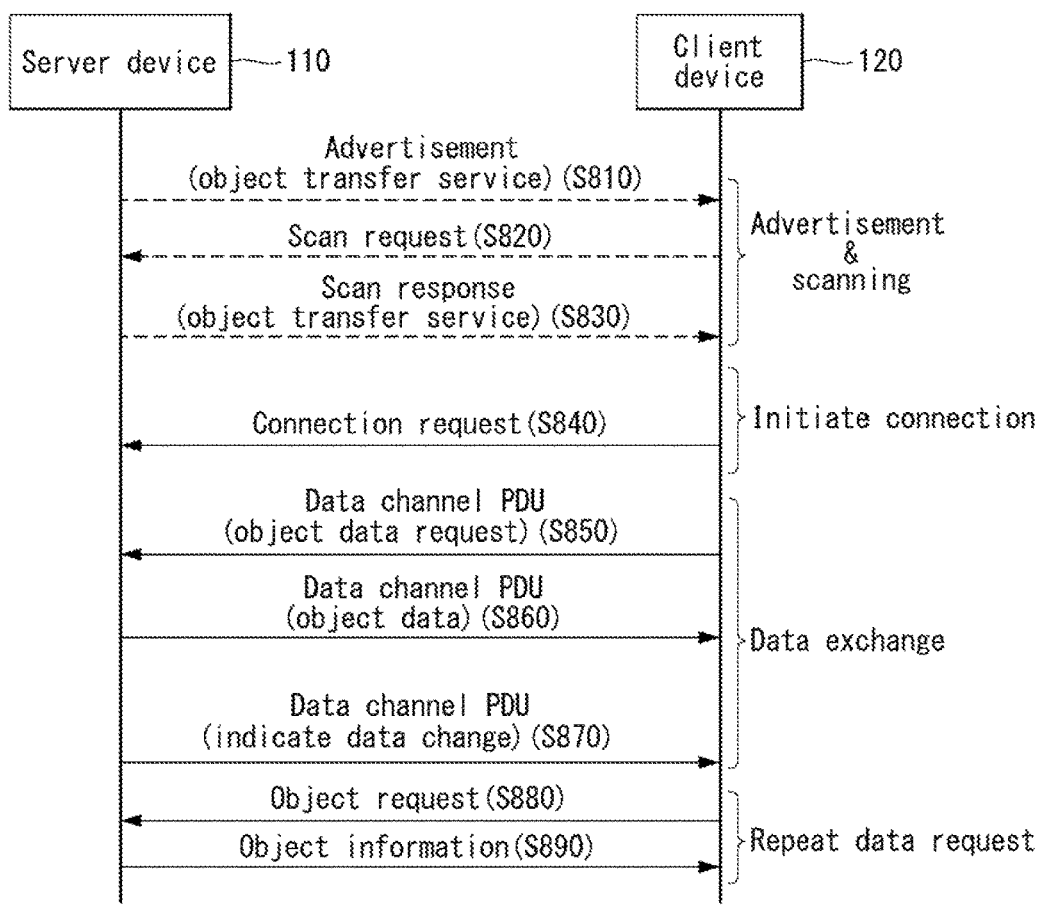

[Fig.9]
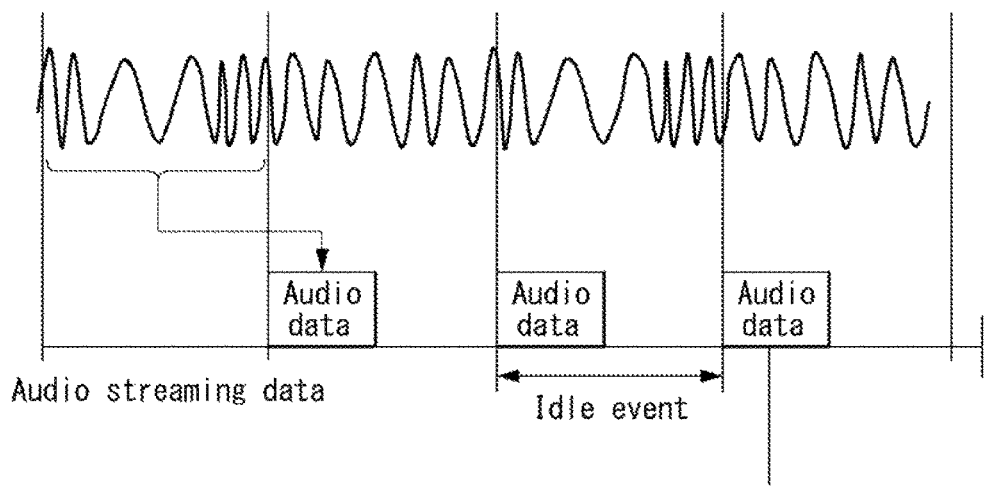

[Fig.10]
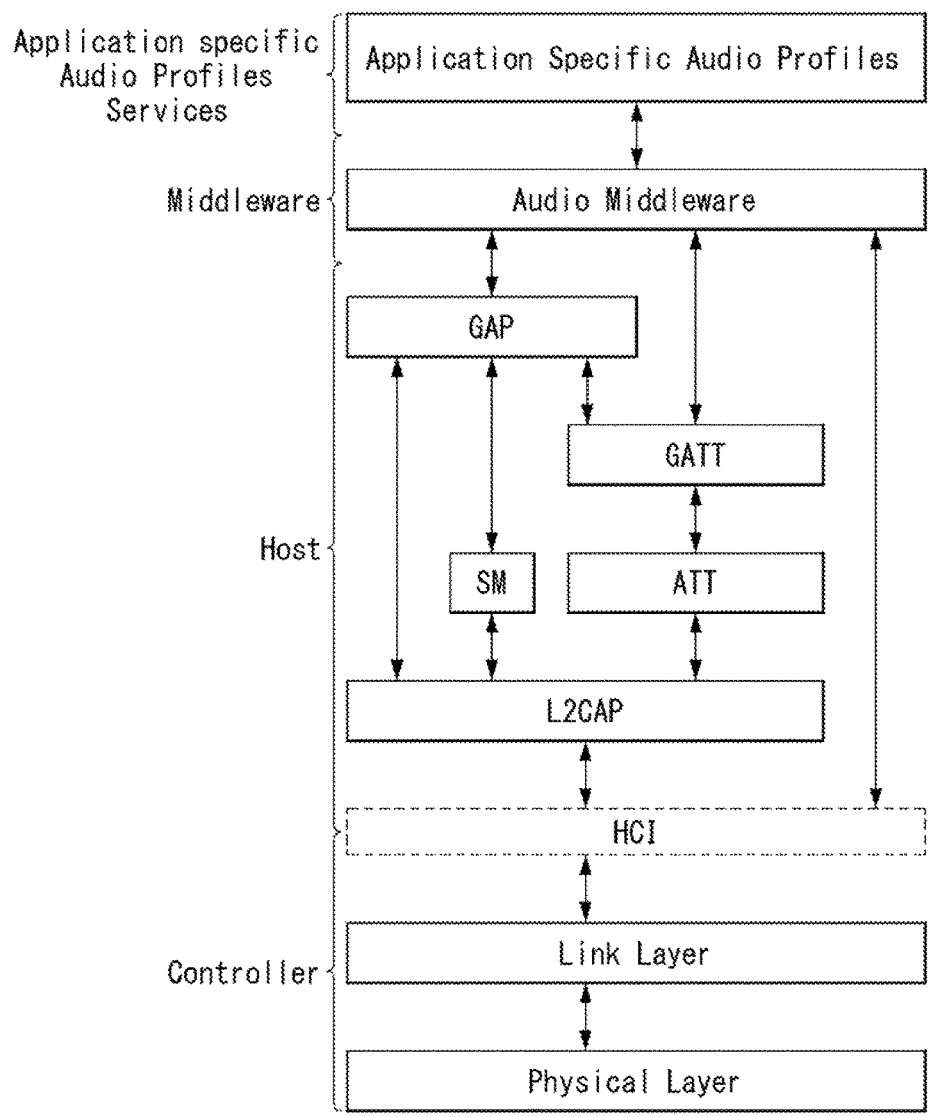

[Fig.11]
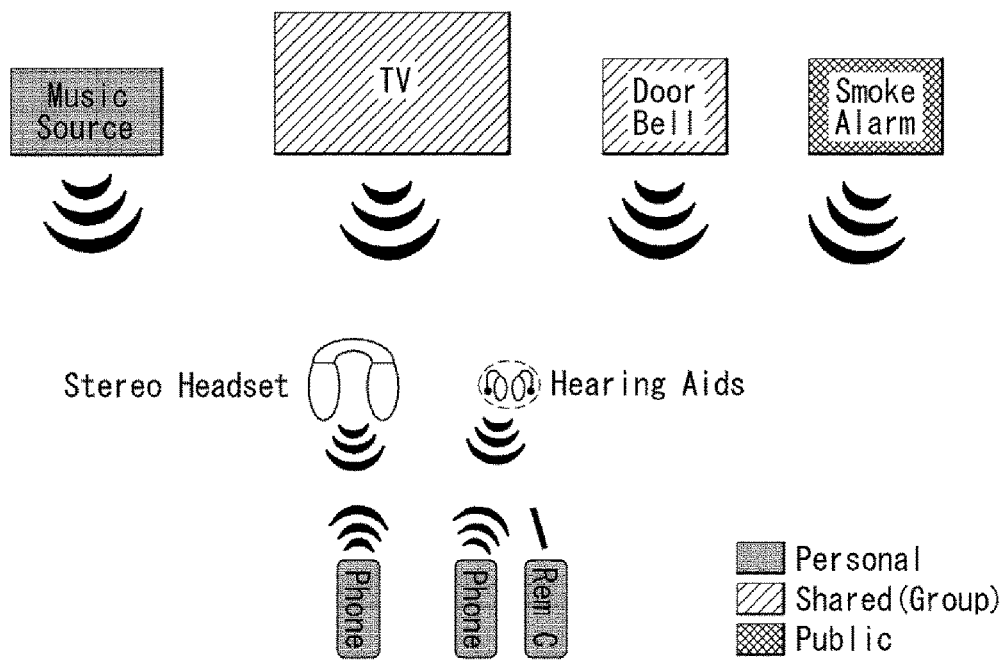

[Fig.12]
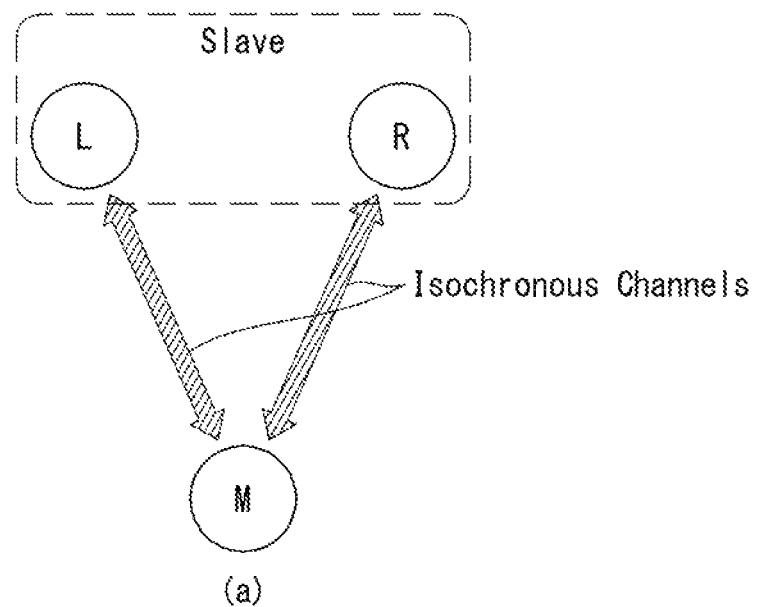
(a)
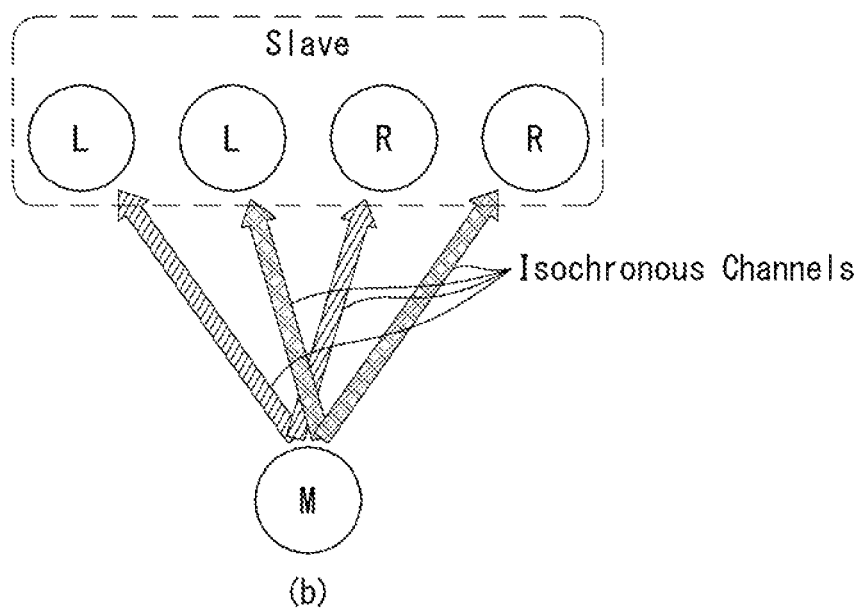
(b)

[Fig.13]
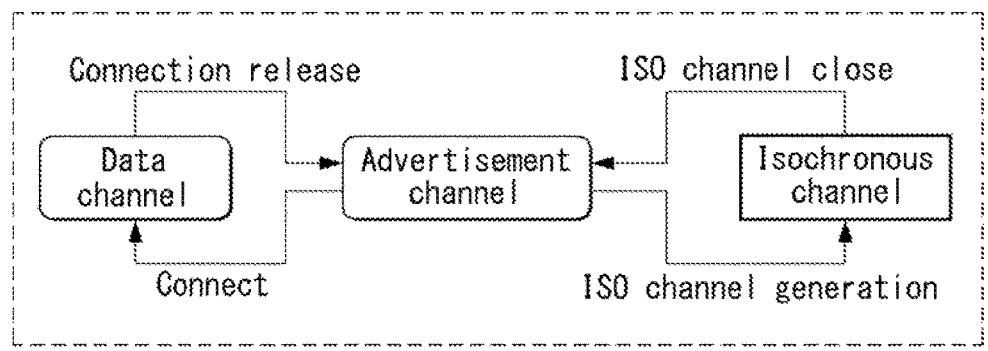

[Fig.14]
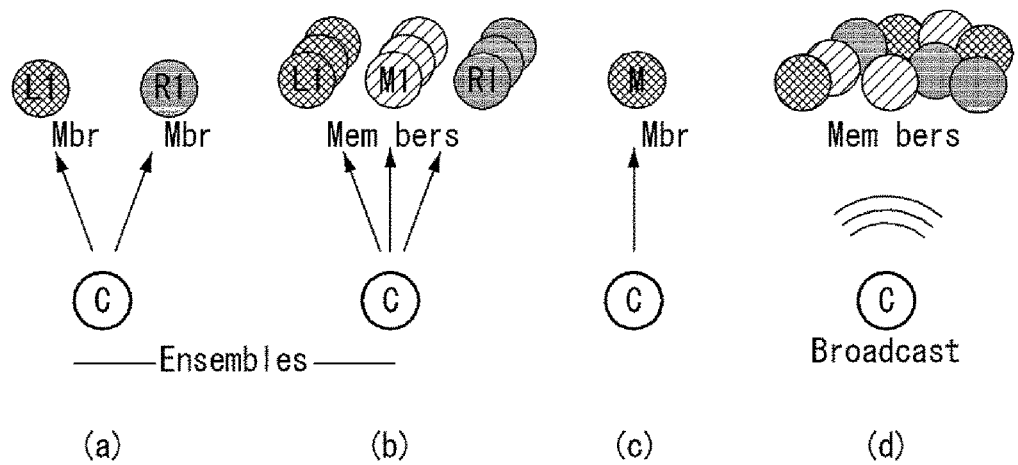

[Fig.15]
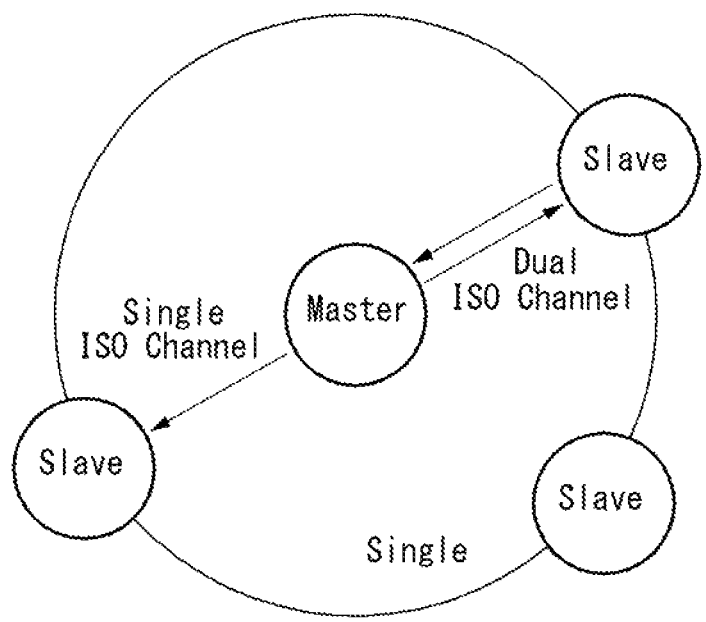

[Fig.16]
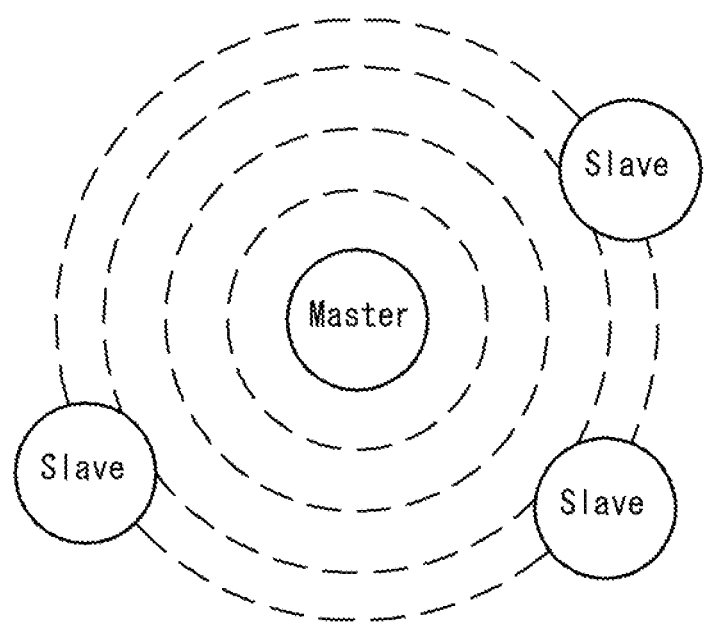

[Fig.17]
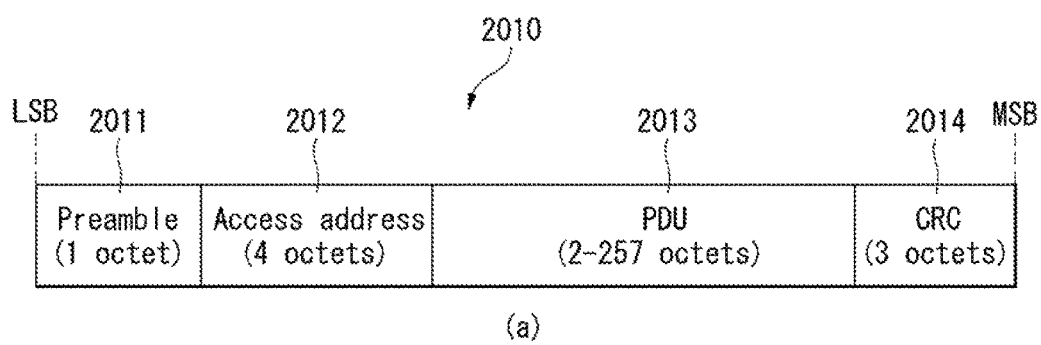
(a)
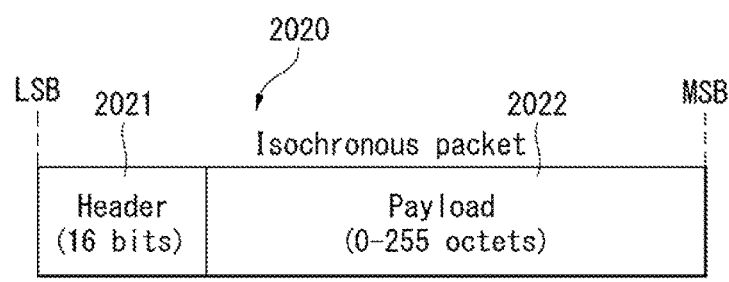
(b)

[Fig.18]
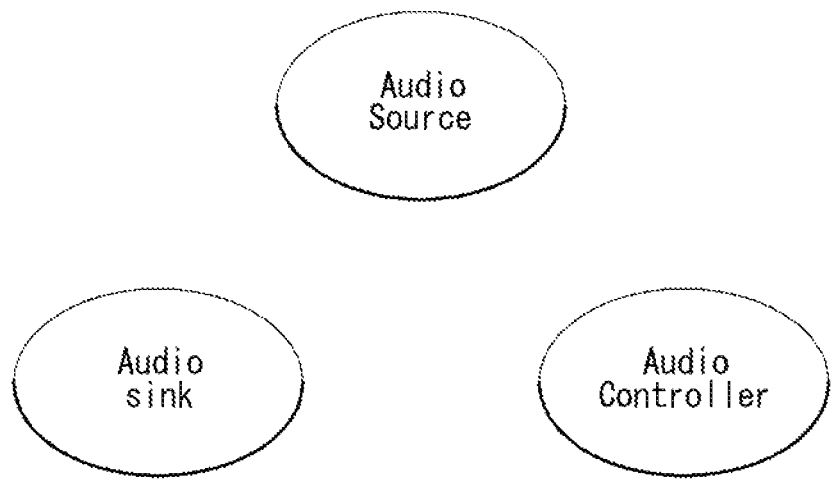

[Fig.19]
 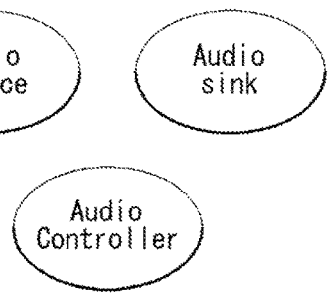 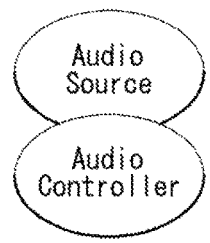
(a)          (b)
 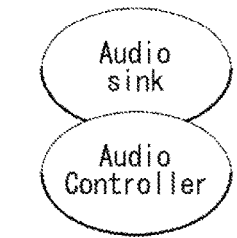 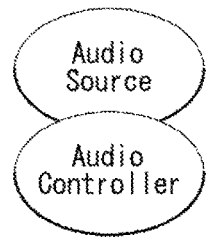
(c)          (d)
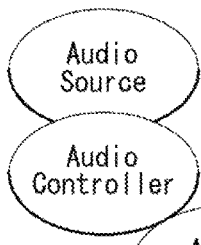 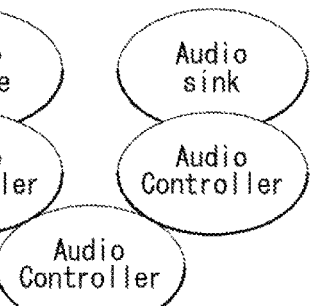
(e)

[Fig.20]
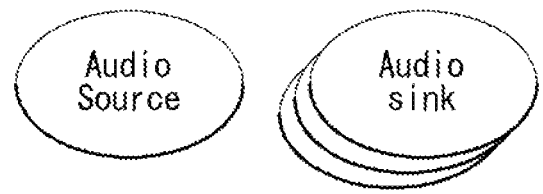
(a)
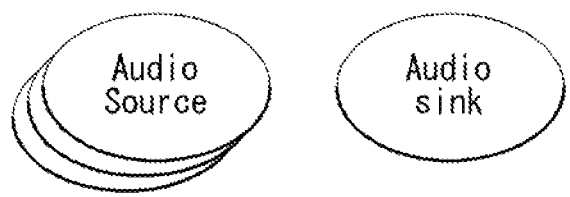
(b)
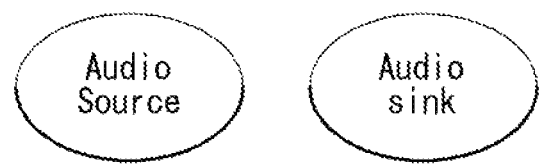
(c)

[Fig.21]
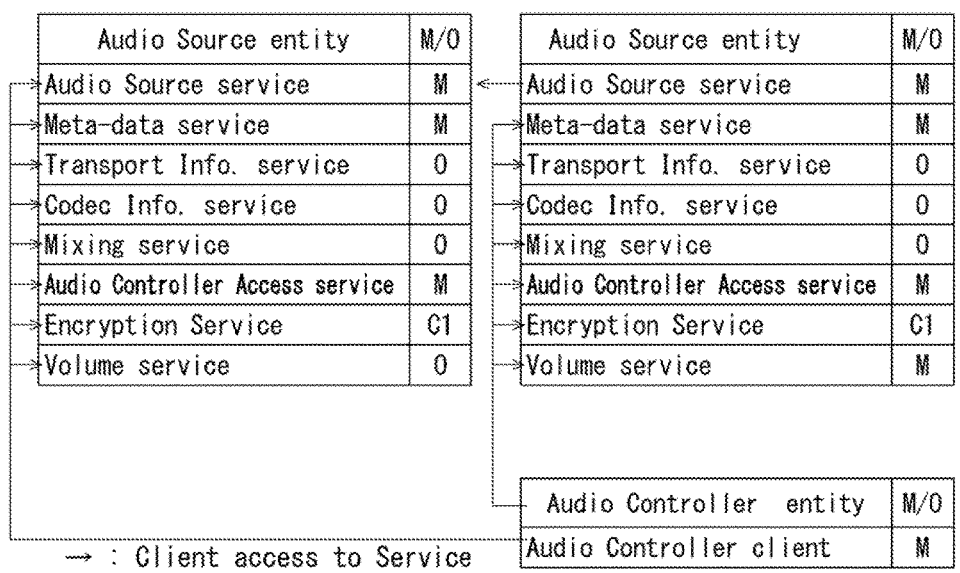
M/O : Mandatory or Optional
C1 : mandatory if connection oriented channel,
optional if connectionless channel

[Fig.22]

| C/S | entity | description |
|---|---|---|
| service | Audio Source | - Provide interfaces to audio streaming (start, stop, suspend and resume) and can be controlled by the command sent by audio controller<br>- Send Advertising information related to audio stream (codec information, meta-data, source stream parameters, etc) |
| | Audio Sink | - Provide interface for synchronization to the stream served by audio source<br>- Rendering audio stream<br>- Send advertising information related on the exist of audio sink |
| | Meta-data | - Provide meta-data related on audio stream<br>- channel info, stream info, bit-rate, codec, sample rate, audio source info, audio sink info, Language, stream identifier, number of channels, application type(alarm, public announcement, phone call, music, video, advertisement) |
| | Audio Controller Access | - Provide interfaces for registering and maintaining one or more audio controller clients<br>- Provide access control . It allows to prevent access from unauthorized audio controller client.<br>- Audio controller client can uses the service offered by audio source and audio sink after registration.<br>- Obtaining audio streaming information from audio source |
| | Codec information | - Provide an interface to query supported codec list.<br>- Audio source and audio sink support this service. Audio controller client negotiate & match information after querying information from audio source and audio sink. |
| | Transport information | - Provide interfaces to get transport parameters.<br>- Audio source and audio sink support this service. Audio controller client negotiate & match information after querying information from audio source and audio sink. |
| | Mixing | - Provide features for mixing audio channels into one channel.<br>- This service can be supported by audio source and audio sink. |
| | Volume | - Provide feature for up/down the volume<br>- This can be supported by audio source and audio sink |
| client | Audio controller | - Use all services supported by audio source and audio sink<br>- This client can be located in audio controller entity. Audio controller entity can be resided in the audio source device, audio sink device or dedicated separate remote control. |
| | Audio Sink | - Obtaining audio streaming information from audio controller<br>- Synchronizing audio streaming information from audio source for receiving audio stream data<br>- Can only be located in audio sink |

[Fig.23]

Terminology to Service mapping

| Svc# | entity / channel mapping | Audio Source | Audio Controller | Audio Sink |
|---|---|---|---|---|
| 1 | Audio-A (Advertising, Announcement) | service | client | service |
| 2 | Audio-B (Control, Configuration) | service | client | service |
| 3 | Audio-C (Streaming) | service | – | client |

(a)

Service mapping within Client-Server Architecture

| Svc# | entity / channel mapping | | Audio Source | Audio Controller | Audio Sink |
|---|---|---|---|---|---|
| 1 | Audio Source service | (for Audio-A) | service | client | – |
| 2 | | (for Audio-C) | service | client | – |
| 3 | | (for Audio-S) | service | – | client |
| 4 | Audio Sink service | (for Audio-A) | – | client | service |
| 5 | | (for Audio-C) | – | client | service |
| 6 | | (for Audio-S) | – | – | – |
| 7 | Meta-data service | | service | client | – |
| 8 | Transport Information service | | service | client | service |
| 9 | Cdoec Information service | | service | client | client |
| 10 | Contents Protection service | encryption service | service | client | – |
| 11 | | decryption service | – | client | service |
| 12 | Audio Controller Access service | | service | client | client |
| 13 | Mixing service | | service | client | client |
| 14 | Volume service | | service | client | client |

(b)

[Fig.24]
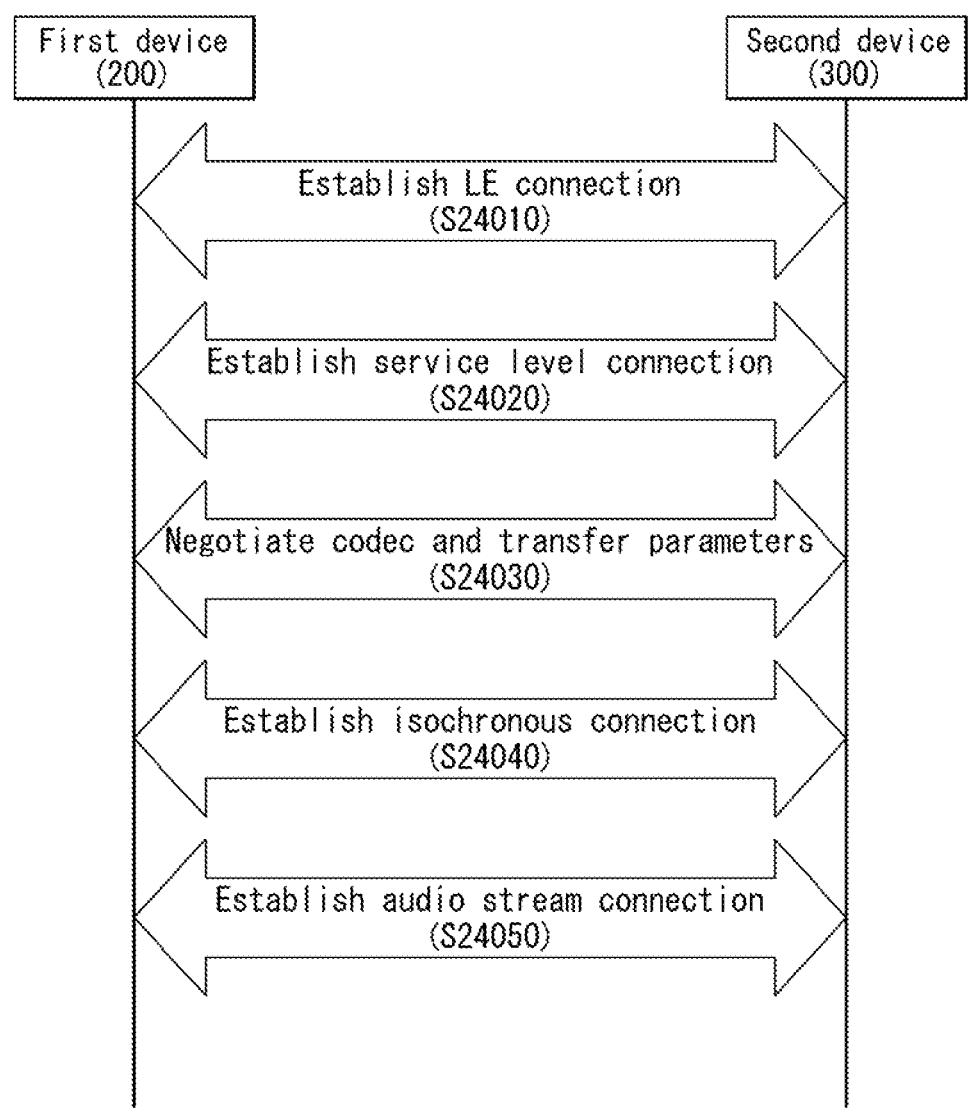

[Fig.25]
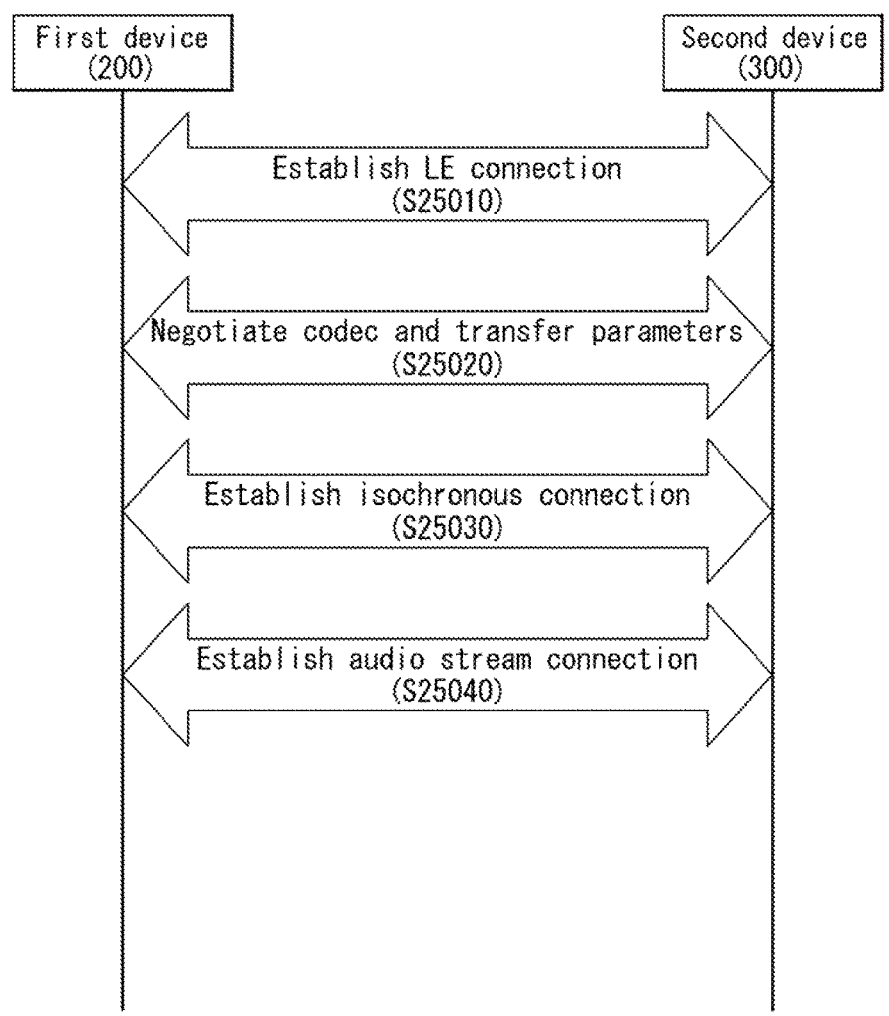

[Fig.26]
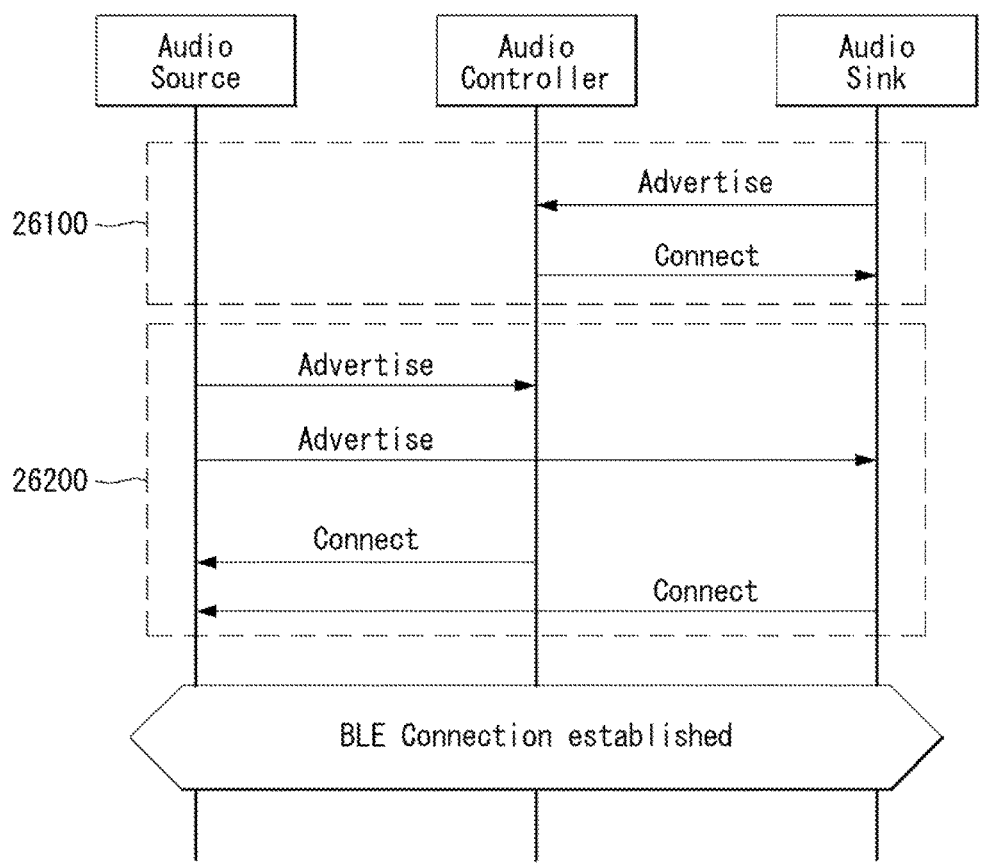

[Fig.27]
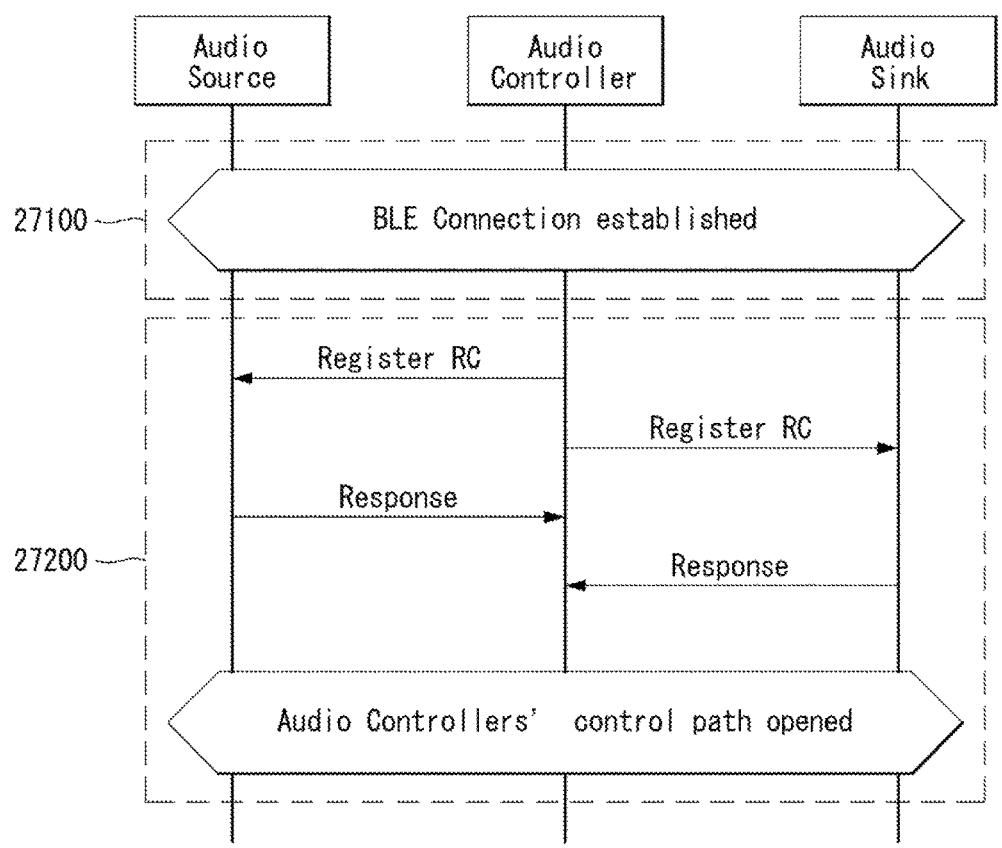

[Fig.28]
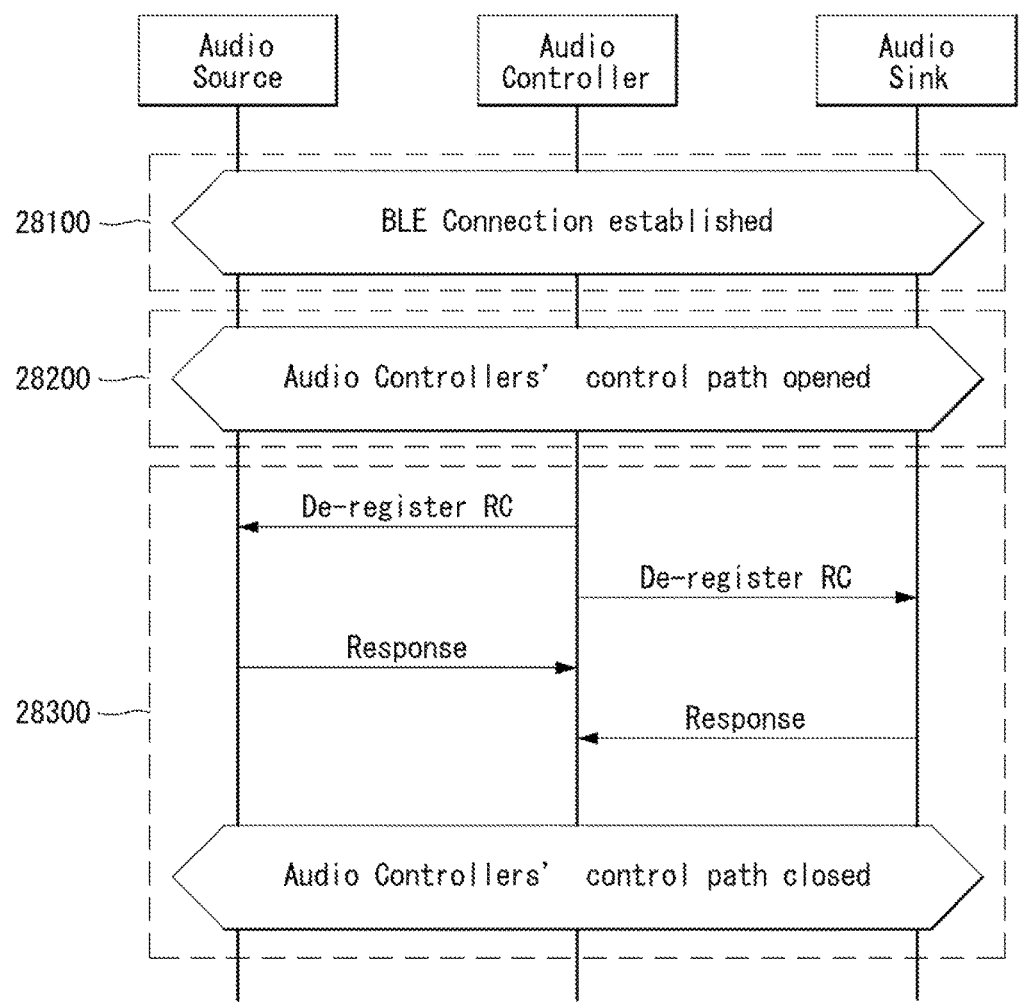

[Fig.29]
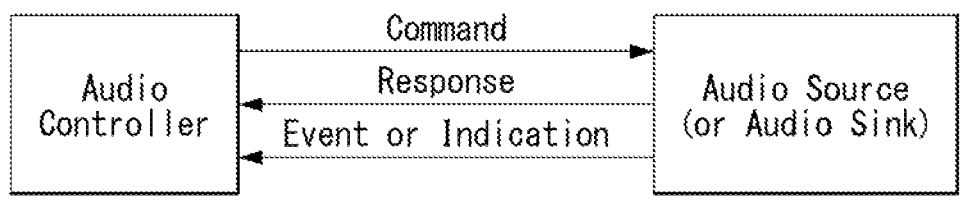

[Fig.30]
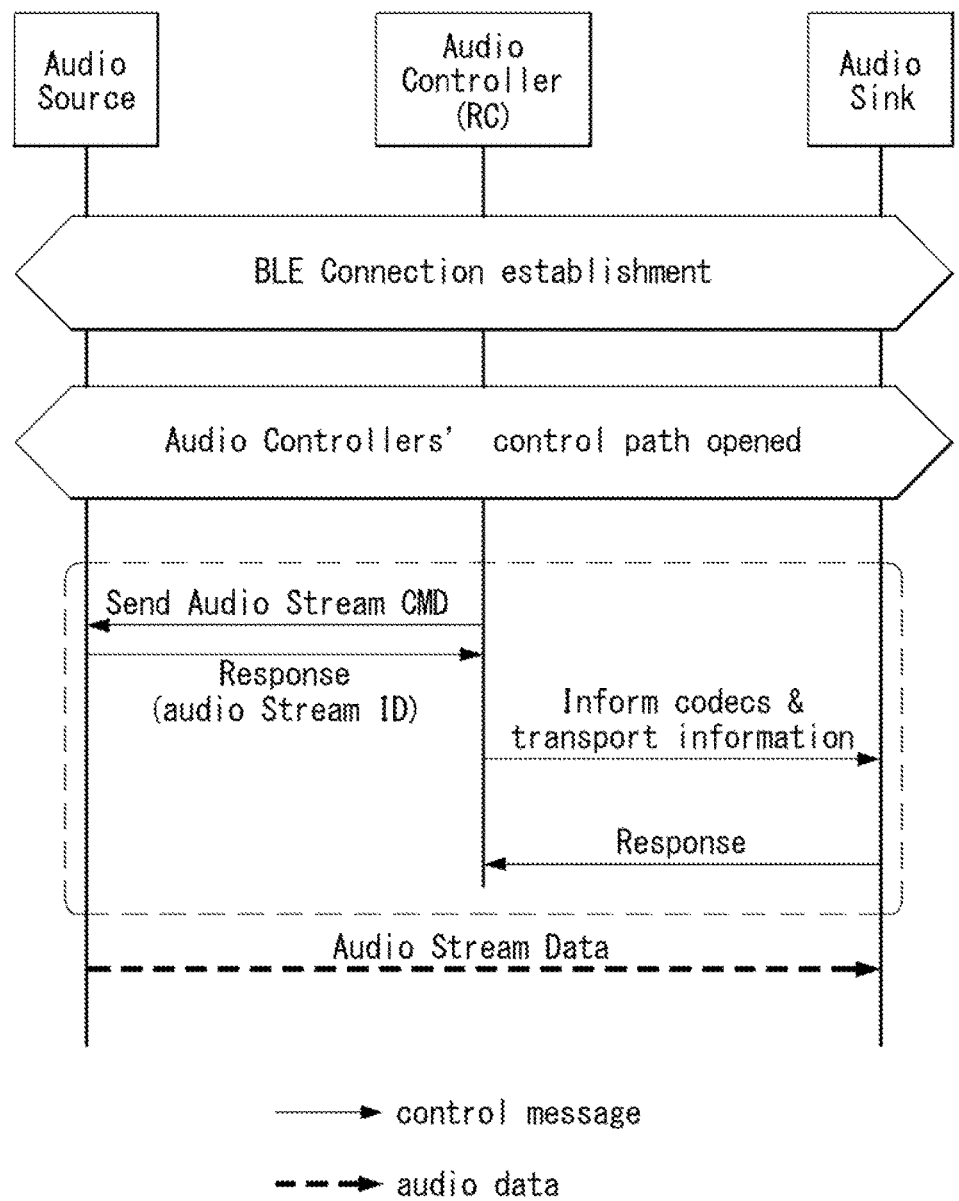

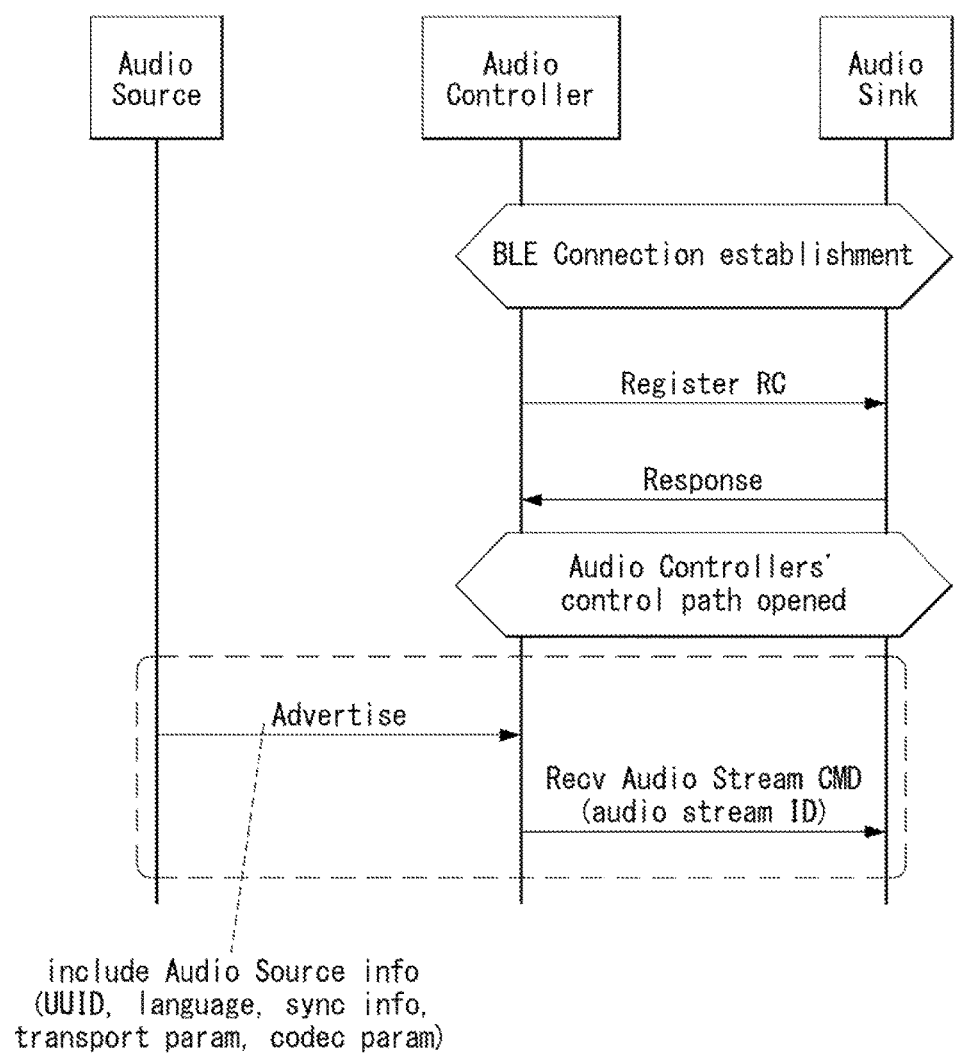
[Fig.31]

[Fig.32]

| RC Access Level | Permission | Priority | Note |
|---|---|---|---|
| Full | exclusive access permission + user level permission | 1 | - |
| Normal | user level permission | 2 | - |
| Limited | limited user level permission | 3 | - May only be applied using the service in Broadcast use case |

[Fig.33]
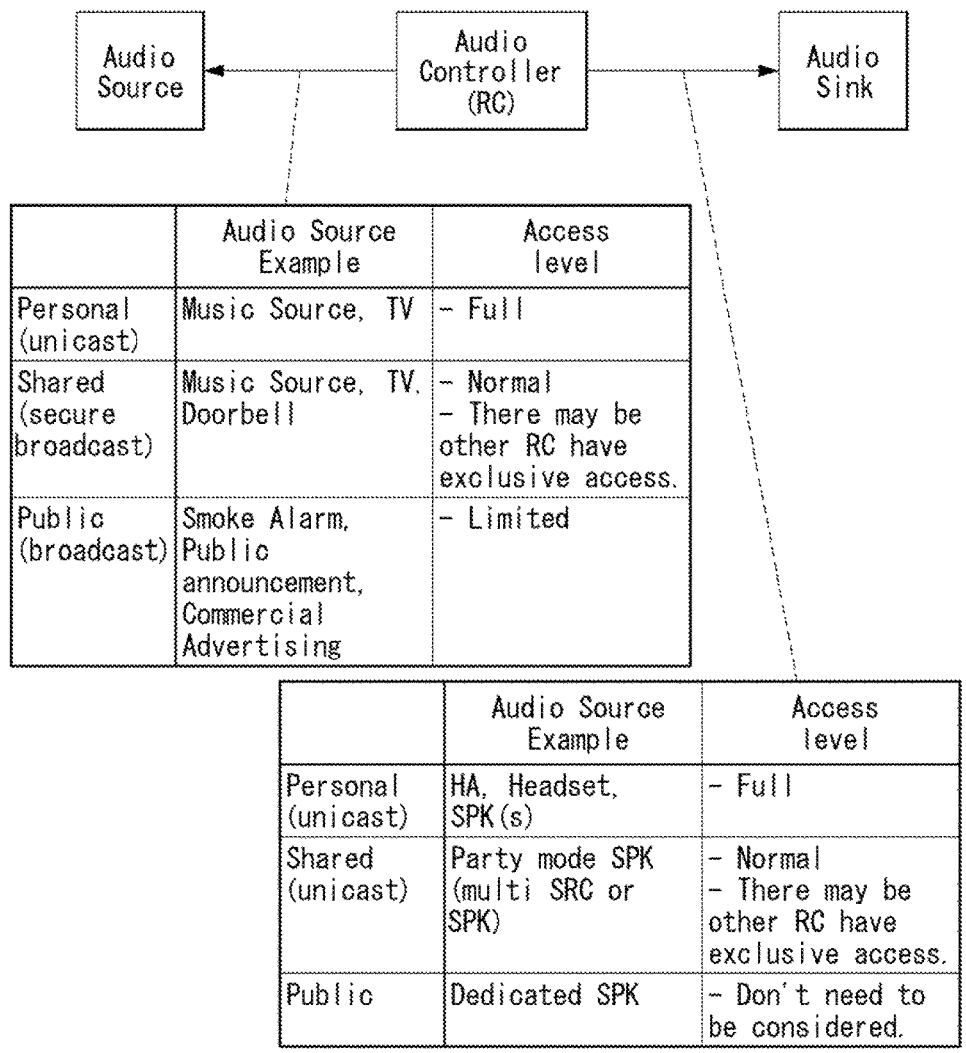

[Fig.34]

| Use case environment | Exclusive access | Non-exclusive access | Note |
|---|---|---|---|
| Personal | TBD (X/O) | O | May have dedicated RC |
| Shared | O | X | Should have dedicated RC |
| Public | - | - | - |

[Fig.35]
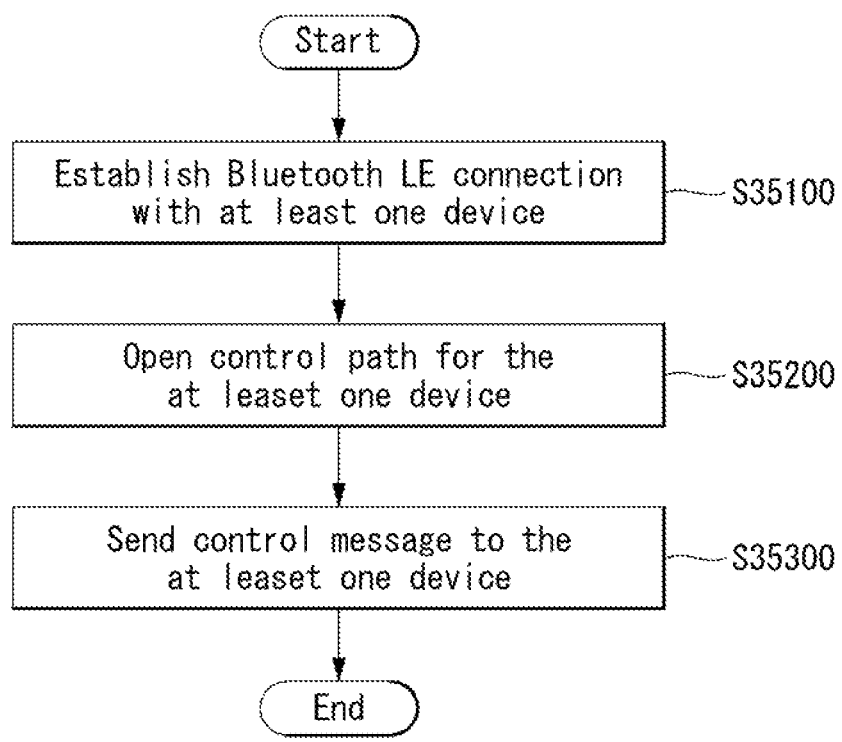

METHOD AND APPARATUS FOR TRANSMITTING AND RECEIVING DATA IN WIRELESS COMMUNICATION SYSTEM

CROSS-REFERENCE TO RELATED APPLICATIONS

This non-provisional application claims the benefit under 35 U.S.C. § 119(e) to U.S. Provisional Application No. 62/265,428, filed on Dec. 10, 2015, which is hereby expressly incorporated by reference into the present application.

BACKGROUND OF THE INVENTION

Field of the Invention

The present invention relates to a method and apparatus for connecting alternative communication means using Bluetooth, that is, a short-range communication technology, in a wireless communication system and, more particularly, to a method and apparatus for providing the transmission and reception of audio streams using a Bluetooth low energy (BLE) technology.

Related Art

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

SUMMARY OF THE INVENTION

This specification is directed to a method of transmitting and receiving data using Bluetooth Low Energy (LE) technology in a wireless communication system.

One embodiment of the present invention provides a method in which a first device transmits and receives data to and from a second device and a third device using Bluetooth Low Energy technology in a wireless communication system, the second device being a device that transmits an audio stream, and the third device being a device that receives the audio stream, the method including: establishing a Bluetooth LE connection with at least one device; opening a control path for the at least one device; and transmitting a control message associated with audio streaming to the at least one device via the control path, the opening of a control path including: sending to the at least one device a registration request message for registering the first device as a remote controller; and receiving a response message from the at least one device as a response to the registration request message.

In an embodiment, if the second device transmits the audio stream through broadcast, the at least one device may correspond to the third device, the method further including receiving from the second device an advertising message containing audio source information after the opening of a control path, wherein, in the transmitting of a control message to the at least one device, the first device may transmit the control message to the third device upon receiving the advertising message, and the control message may be generated based on the audio source information contained in the advertising message.

In an embodiment, the audio source information may include at least one among the audio stream's identification information, language information, synchronization information, transport information, and codec information.

In an embodiment, the establishing of a Bluetooth LE connection may include establishing a Bluetooth LE connection with the second device and the third device, the opening of a control path may include opening a control path for the second device and the third device, and the transmitting of a control message to the at least one message may include: transmitting to the second device a first control message associated with the transmission of the audio stream; and transmitting to the third device a second control message associated with the reception of the audio stream, wherein the second control message may be generated based on a response message received from the second device as a response to the first control message.

In an embodiment, the second control message may contain audio stream identification for identifying the audio stream transmitted by the second device.

One embodiment of the present invention provides a first device which transmits and receives data to and from a second device and a third device using Bluetooth Low Energy technology, the second device being a device that transmits an audio stream, and the third device being a device that receives the audio stream, the first device including: a communication part for communicating with the outside in a wired or wireless manner; and a processor functionally connected to the communication part, wherein the processor may establish a Bluetooth LE connection with at least one device, open a control path for the at least one device, and transmit a control message associated with audio streaming to the at least one device via the control path, the opening of a control path including: sending to the at least one device a registration request message for registering the first device as a remote controller; and receiving a response message from the at least one device as a response to the registration request message.

Technical objects to be achieved in this specification are not limited to the aforementioned objects, and those skilled in the art to which the present invention pertains may evidently understand other technical objects from the following description.

Advantages which may be obtained in this specification are not limited to the aforementioned advantages, and various other advantages may be evidently understood by those skilled in the art to which the present invention pertains from the following description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 shows an example of a wireless communication system using a BLE technology according to an embodiment of the present invention.

FIG. 2 shows an example of an internal block diagram of a server device and a client device capable of implementing methods according to embodiments of the present invention.

FIG. 3 shows an example of a BLE network topology.

FIGS. 4 and 5 show examples of Bluetooth communication architecture to which methods according to embodiments of the present invention may be applied.

FIG. 6 shows an example of the GATT Profile structure of the BLE specification.

FIG. 7 shows an example of a method for the connection procedure of the BLE specification.

FIG. 8 is a flowchart illustrating an example of a method for providing an object transfer service according to the BLE technology.

FIG. 9 illustrates the characteristics of an audio signal.

FIG. 10 shows an example of a protocol stack of BLE which may use an isochronous channel.

FIG. 11 shows an example of a home ecosystem for applications to which an isochronous channel may be applied.

FIG. 12 shows an example of the type of an isochronous channel.

FIG. 13 shows an example of an operating state transition according to the BLE technology.

FIG. 14 shows various examples of isochronous stream transfer through an isochronous channel.

FIGS. 15 and 16 illustrate another example of a data transfer method using an isochronous channel.

FIG. 17 shows examples of an isochronous channel packet format which may be applied to methods according to embodiments of the present invention.

FIG. 18 is a diagram illustrating audio entities for audio transmission according to an embodiment of the present invention.

FIG. 19 shows physical topologies of audio entities according to an embodiment of the present invention.

FIG. 20 shows multiplicity topologies of audio entities according to one embodiment of the present invention.

FIG. 21 shows client-server interactions within audio entities according to one embodiment of the present invention.

FIG. 22 is a table of definitions of service/client characteristics according to one embodiment of the present invention.

FIG. 23 shows service usage architectures in respective entities according to one embodiment of the present invention.

FIG. 24 is a flowchart illustrating an example of a method for sending and receiving audio streams through an LE connection to which a method proposed in this specification may be applied.

FIG. 25 is a flowchart illustrating another example of a method for sending and receiving audio streams through an LE connection to which a method proposed in this specification may be applied.

FIG. 26 is a flowchart illustrating a method of establishing a BLE connection according to an embodiment of the present invention.

FIG. 27 is a flowchart showing a method of registering an audio controller according to one embodiment of the present invention.

FIG. 28 is a flowchart showing a method of deregistering an audio controller according to one embodiment of the present invention.

FIG. 29 shows a codec and transport negotiation procedure according to one embodiment of the present invention.

FIG. 30 shows an audio stream provision method according to one embodiment of the present invention.

FIG. 31 shows an audio stream provision method according to another embodiment of the present invention.

FIG. 32 shows a table of access levels to an audio controller according to one embodiment of the present invention.

FIG. 33 is a conceptual diagram showing access from an audio controller to an audio source or audio sink according to one embodiment of the present invention.

FIG. 34 is a table showing exclusive or non-exclusive access from an audio controller to an audio source or audio sink according to one embodiment of the present invention.

FIG. 35 shows a method of transmitting and receiving data according to one embodiment of the present invention.

DESCRIPTION OF EXEMPLARY EMBODIMENTS

Hereinafter, the present invention is described in more detail with reference to appended drawings.

A suffix, such as "module" and "unit" introduced in the description herein, is assigned merely to facilitate description of this document, and the "module" and "unit" may be used interchangeably.

In this document, a device refers to a device capable of wireless communication, including a mobile phone, such as a smart phone, a tablet PC, a desktop computer, a notebook, and television, such as smart TV and IPTV.

Hereinafter, embodiments of the present invention are described in detail with reference to the accompanying drawings and description contained in the drawings, but the technical scope of the present invention is not restricted by the embodiments.

Wherever possible, general terms widely known to the public have been chosen as long as the terms do not obscure their technical functions intended in the present invention; however, those terms may be changed depending on the intention of those skilled in the art, practices, or the advent of a new technology.

In some cases, specific terms are chosen arbitrarily; in that case, a specific meaning of a corresponding term is described in a corresponding description.

Therefore, the terms used in this document should be interpreted on the basis of their actual meanings and description throughout the document rather than the immediate names of the terms.

FIG. 1 shows an example of a wireless communication system using a BLE technology according to an embodiment of the present invention.

The wireless communication system 100 includes at least one server device 110 and at least one client device 120.

The server device and the client device perform Bluetooth communication using Bluetooth low energy (hereinafter referred to as "BLE", for convenience sake) technology.

First, compared to a Bluetooth basic rate/enhanced data rate (BR/EDR) technology, the BLE technology requires a relatively small duty cycle. Products based on the BLE technology may be manufactured at a low cost, and may require very small power consumption at a low speed data transfer rate. The products may operate more than one year with a coin cell battery.

Furthermore, the BLE technology simplifies a connection procedure between devices and requires a smaller packet size than the Bluetooth BR/EDR technology.

Features of the BLE technology may be summarized as follows: (1) the number of RF channels is 40, (2) a data transfer rate of 1 Mbps is supported, (3) a star topology is used, (4) latency is 3 ms, (5) a maximum current is less than 15 mA, (6) output power is less than 10 mW (10 dBm), and (7) major application fields include mobile phones, watch, sports, health-care, sensor, and device control.

The server device 110 may operate as a client device in a relationship with a different device. Likewise, the client device may operate as a server device in a relationship with a different device. In other words, in a BLE communication system, a device may operate as a server device or a client device. In some cases, a device may operate as a server device and a client device at the same time.

The server device 110 may be called a data service device, master device, master, server, conductor, host device, audio source device, or first device. The client device may be called a slave device, slave, client, member, sink device, audio sink device, or second device.

The server device and the client device form a main part of a wireless communication system, and the wireless communication system may include other elements in addition to the server device and the client device.

The server device refers to a device which receives data from a client, directly performs communication with the client device. When receiving a data request from the client device, the server device provides data to the client device through a response.

Furthermore, the server device sends a notification message and indication message to the client device to provide information to the client device. Furthermore, when transmitting an indication message to the client device, the server device receives a confirm message corresponding to the indication message from the client device.

Furthermore, the server device may provide information to the user through a display unit or receive a request input from the user through a user input interface while transmitting and receiving notification, indication, and confirm messages to and from the client device.

Furthermore, the server device may read data from a memory unit or write new data to the corresponding memory while transmitting and receiving messages to and from the client device.

Furthermore, one server device may be connected to a plurality of client devices and may be easily connected to client devices again using bonding information.

The client device 120 refers to a device which requests information and data transmission from a server device.

The client device receives data from the server device through a notification message and indication message. When receiving an indication message from the server device, the client device sends a confirm message to the server device.

Like the server device, the client device may provide information to a user through a display unit or may receive an input from the user through a user input interface while transmitting and receiving messages to and from the server device.

Furthermore, the client device may read data from the memory unit or write new data into the memory unit while transmitting and receiving messages to and from the server device.

Hardware components, such as the display unit, user input interface, and memory unit of the server device or client device, are described in detail with reference to FIG. 2.

Furthermore, the wireless communication system may form a personal area network (PAN) using a Bluetooth technology. For example, the wireless communication system may exchange files and documents in a prompt and safe manner by forming a private piconet among devices.

A BLE device may operate in order to support various Bluetooth-related protocols, profiles, and processes.

FIG. 2 shows an example of the internal block diagram of a server device and client device capable of implementing methods according to embodiments of the present invention.

The server device may be connected to at least one client device.

Furthermore, in some embodiments, the internal block diagram of each device may further include other elements (or modules, blocks or units), and some of the elements of FIG. 2 may be omitted.

As shown in FIG. 2, the server device includes a display unit 111, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present invention.

Furthermore, the client device includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present invention.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device or the client device, and controls the server device or the client device in order to request the transmission of a message through the Bluetooth interface or other interface and to process a received message.

The processor 114, 124 may be represented by a controller or a control unit.

The processor 114, 124 may include application-specific integrated circuits (ASICs), other chipsets, logical circuits and/or data processing devices.

The memory 115, 125 may include read-only memory (ROM), random access memory (RAM), flash memory, a memory card, a storage medium and/or other storage devices.

The communication unit 118, 127 may include a baseband circuit for processing a radio signal. If an embodiment is implemented in the form of software, the aforementioned method may be implemented by a module (process or function) which performs the aforementioned function. The module is stored in the memory and is performed by the processor.

The memory 115, 125 may be installed inside or outside the processor 114, 124 and may be connected to the processor 114, 124 through various well-known means.

The display unit 111, 121 refers to a module for providing status information about a device and message exchange information to a user through a display.

The power supply unit 113, 123 refers to a module for receiving external or internal power under the control of the controller and for supplying power for the operation of each element.

As described above, BLE technology is characterized by a small duty cycle, and considerably reduces power consumption at a low data transfer rate. Accordingly, the BLE technology is capable of supplying power for the operation of each element even with small output power (which is less than 10 mW (10 dBm)).

The user input interface 112, 122 refers to a module for providing a user input, such as a display button to the controller, so that the user may control the operation of a device.

FIG. 3 shows an example of a BLE network topology.

Referring to FIG. 3, a device A corresponds to a piconet (piconet A, the shaded area) master having a device B and a device C as slaves.

In this case, a piconet refers to a set of devices in which one of a plurality of devices functions as a master and the others occupy a shared physical channel connected to the master device.

A BLE slave does not share a common physical channel with a master. Each slave communicates with a master through a separate physical channel. There is another piconet (piconet F) including a master device F and a slave device G.

A device K belongs to a scatternet K. In this case, the scatternet refers to a group of piconets interconnected to each other.

A device K is the master of a device L and also a slave of a device M.

A device O also belongs to a scatternet O. The device O is a slave of a device P and also a slave of a device Q.

FIG. 3 illustrates a case where five different device groups are formed.

A device D is an advertiser, and a device A is an initiator (group D).

A device E is a scanner, and a device C is an advertiser (group C).

A device H is an advertiser, and a device I and a device J are scanners (group H).

The device K is also an advertiser, and a device N is an initiator (group K).

A device R is an advertiser, and the device O is an initiator (group R).

The device A and the device B use one BLE piconet physical channel.

The device A and the device C use another BLE piconet physical channel.

In the group D, the device D performs advertising using an advertisement event which may be connected to an advertising physical channel, and the device A is an initiator. The device A may establish a connection to the device D and add a device to the piconet A.

In the group C, the device C performs advertising through an advertising physical channel using a certain type of an advertisement event captured by the scanner device E.

The group D and the group C may use different advertising physical channels or different time frames so as to avoid a collision.

The piconet F has one physical channel. The device F and the device G use a single BLE piconet physical channel. The device F is a master, and the device G is a slave.

The group H has one physical channel. The devices H, I, and J use one BLE advertising physical channel. The device H is an advertiser, and the devices I and J are scanners.

In the scatternet K, the devices K and L use a single BLE piconet physical channel. The devices K and M use another BLE piconet physical channel.

In the group K, the device K performs advertising using an advertisement event which may be connected to an advertising physical channel, and the device N is an initiator. The device N may establish a connection with the device K. In this case, the device K functions as a slave of two devices and also as a master of one device.

In the scatternet O, the devices O and P use a single BLE piconet physical channel. The devices O and Q use different BLE piconet physical channels.

In the group R, the device R performs advertising using an advertisement event which may be connected to an advertising physical channel, and the device O is an initiator. The device O may establish a connection with the device R. In this case, the device O functions as a slave of two devices and also a master of one device.

FIGS. 4 and 5 illustrate an example of Bluetooth communication architecture to which methods according to embodiments of the present invention may be applied.

More specifically, FIG. 4 shows an example of the Bluetooth BR/EDR technology, and FIG. 5 shows an example of Bluetooth Low Energy (BLE) architecture.

First, as shown in FIG. 4, the Bluetooth BR/EDR architecture includes a controller stack 410, a host controller interface (HCI) 420, and a host stack 430.

The controller stack 410 (or controller module) refers to hardware for sending or receiving Bluetooth packets to and from a wireless transmission and reception module dealing with Bluetooth signals of 2.4 GHz. The controller stack 410 includes a BR/EDR Radio layer 411, a BR/EDR Baseband layer 412, and a BR/EDR Link Manager layer 413.

The BR/EDR Radio layer 411 sends and receives radio signals of 2.4 GHz, and is capable of transmitting data by hopping 79 RF channels when Gaussian frequency shift keying (GFSK) modulation is used.

The BR/EDR baseband layer 412 sends a digital signal, selects a channel sequence in which hopping is performed 1600 times per second, and sends time slot spanning of 625 us for each channel.

The link manager layer 413 controls an overall operation of BLE, such as link setup, control, and security, using a link manager protocol (LMP).

The link manager layer 413 may perform the following functions.

Control of ACL/SCO logical transport and logical link setup

Detach: removes a connection and informs a corresponding device of a cause of removal.

Performs power control and role switch

Performs a security function, such as authentication, pairing, and encryption.

The host controller interface layer 420 provides an interface between a host module 430 and a controller module 410 so that a host may provide a command and data to a controller and the controller may provide an event and data to the host.

The host stack (or host module) 430 includes a logical link control and adaptation protocol (L2CAP) 437, a service discovery protocol (SDP) 433, a BR/EDR protocol 432, BR/EDR profiles 431, an attribute protocol 436, a generic access profile (GAP) 434, and a generic attribute profile (GATT) 435.

The L2CAP 437 provides one bilateral channel for sending data according to a specific protocol or specific profile.

The L2CAP multiplexes various protocols and profiles provided by Bluetooth upper layers.

The L2CAP of the Bluetooth BR/EDR specification uses a dynamic channel; supports a protocol service multiplexer, retransmission, and streaming mode, and provides segmentation and reassembly, per-channel flow control, and error control.

The SDP 433 refers to a protocol used to search for a service (or a profile and protocol) supported by a Bluetooth service.

The BR/EDR protocols and profiles 432, 431 define a service using the Bluetooth BR/EDR specification and an application protocol by which an exchange of data is performed.

The attribute protocol 436 relies on a server-client structure, which defines a rule for a corresponding device so as to access data. Six message types are defined as below: a Request message, a Response message, a Command message, a Notification message, and an Indication message.

Request message from a client to a server with a Response message from a server to a client Command message from a client to a server without a Response message Notification message from a server to a client without a Confirm message Indication message from a server to a client with a Confirm message from a client to a server The GATT 435 defines an attribute type.

The GAP 434 defines a method for discovering and connecting a device, and a method for providing information to a user. The GAP provides a privacy scheme.

As shown in FIG. 5, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 510, GATT based profiles 520, a generic attribute profile (GATT) 530, an attribute protocol (ATT) 540, a security manager (SM) 550, and a logical link control and adaptation protocol (L2CAP) 560. The host stack is not limited to the aforementioned composition, but may include various protocols and profiles.

The host stack multiplexes various protocols and profiles provided by that Bluetooth specification using the L2CAP.

First, the L2CAP 560 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 550 authenticates a device, which is a protocol for providing a key distribution.

The ATT 540 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The GAP is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service.

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.
Time: A method for exchanging time information.
FindMe: It provides an alarm service according to the distance.
Proximity: A method for exchanging battery information.

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 590, a link layer 580, and a host controller interface 570.

The physical layer 590 (or a wireless transmission and reception module) sends and receives radio signals of 2.4 GHz, and uses GFSK modulation and frequency hopping utilizing 40 RF channels.

The link layer 580 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption can be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE specification, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices can scan the discoverable device through an advertising (or broadcast) physical channel.

Both of the discovering device and the discoverable device may already have been connected to other Bluetooth devices in a piconet.

Connecting Procedure

A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) from advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters the connection state when a device makes a connection request, that is, an initiating device sends a CONNECT_REQ PDU to an advertising device or the advertising device receives a CONNECT_REQ PDU from the initiating device.

Establishing a connection may be taken into consideration after the link layer enters the connection state. However, establishing a connection when the link layer enters the connection state may not need to be taken into consideration. The only difference between a newly created connection and an existing connection is a supervision timeout value for a link layer connection.

When two devices are connected to each other, they play respective different roles.

A link layer playing the role of a master is called a master device, whereas a link layer playing the role of a slave is called a slave device. A master device adjusts timing of a connection event. In this case, the connection event denotes the time when the mast device and a slave device are synchronized.

A master device (or central device) is a device that periodically scans a connectable advertising signal in order to establish a connection with other devices (slave or peripheral devices), and requests an appropriate device to establish a connection.

Furthermore, once connected to a slave device, a master device sets up timing and supervises a periodic data exchange.

In this case, the timing may be a hopping rule applied to two devices which exchange data through the same channel.

A slave (or peripheral) device is a device that periodically sends a connectable advertising signal in order to establish a connection with other devices (master devices).

Therefore, if a master device which has received a connectable advertising signal sends a connection request, a slave device accepts the request and establishes a connection with the master device.

After a slave device establishes a connection with a master device, the slave device periodically exchanges data by hopping a channel according to timing specified by the master device.

The packets defined in the Bluetooth interface is described briefly below. BLE devices use the packets described below.

Packet Format

The link layer has only one packet format used for both an advertising channel packet and a data channel packet.

Each of the packets includes four fields: a preamble, an access address, a PDU, and CRC.

If one packet is transmitted through an advertising physical channel, the PDU may function as an advertising channel PDU. If one packet is transmitted through a data physical channel, the PDU may function as a data channel PDU.

Advertising Channel PDU

The advertising channel PDU includes a 16 bit header and a payload of various sizes.

The PDU type filed of an advertising channel included in the header supports PDU types defined in Table 1 below.

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDUs

The data channel PDU includes a 16 bit header and a payload of various sizes, and may include a Message Integrity Check (MIC) field.

The procedures, statuses, and packet formats of the BLE technology described above may be applied to perform methods according to embodiments of the present invention.

Hereinafter, the connection procedure defined in the BLE technology is described briefly. As an example of the connection procedure, a method for providing an object transmission service according to the BLE specification is described.

FIG. 6 shows an example of the GATT Profile structure of the BLE specification.

Referring to FIG. 6, one may see the structure for exchanging profile data defined in the BLE specification.

More specifically, the GATT defines a method for exchanging data using a service between BLE devices and characteristics thereof.

In general, a peripheral device (e.g., a sensor device) functions as a GATT server and performs the definition for the service and characteristics.

To read or write data, a GATT client sends a data request to the GATT server, initiates all of the transactions, and receives a response from the GATT server.

The GATT-based operational structure defined in the BLE is based on profiles, services, and characteristics, which form a hierarchical structure as shown in FIG. 6.

The profile may include one or more services, and the one or more services may include one or more characteristics or other services.

The service groups data into logical units and includes one or more characteristics or other services.

Each of the services has the identifier of 16 bits or 128 bits, which is called a universal unique identifier (UUID).

The characteristic forms the lowest unit in the GATT-based operational structure. The characteristic includes only one datum and has a UUID of 16 bits or 128 bits like the service.

The characteristic includes descriptors for various types of information and requires one attribute to describe each piece of information. The characteristic may use a couple of consecutive attributes.

The attribute includes four elements as follows.

Handle: the address of the attribute

Type: the type of the attribute

Value: the value of the attribute

Permission: an access right to the attribute

A connection procedure in BLE is described below. For example, a method for providing an object transfer service according to the BLE is described as the connection procedure.

FIG. 7 shows an example of a method for the connection procedure of the BLE specification.

A server sends an advertisement message through three advertisement channels (S7010).

The server may be called an advertiser before a connection is established and may be called a master after the connection is established. Examples of the server include sensors (e.g., temperature sensors).

Furthermore, the client may be called a scanner before a connection is established and may be called a slave after the connection is established. The client may be a smart phone, for example.

As described above, Bluetooth communication uses a total of 40 channels through a frequency of 2.4 GHz. Three of the 40 channels are advertisement channels, which are used for exchanging packets to establish a connection in addition to various advertising packets.

The remaining 37 channels are data channels which are used for the exchange of data packets after a connection is established.

After receiving the advertisement message, the client may send a scan request to the server in order to obtain additional data (e.g., a server device name) from the server.

The server sends a scan response, together with the remaining data, to the client in response to the scan request.

In this case, the scan request and the scan response are one type of an advertisement packet which may include only user data of 31 bytes or less.

Therefore, if a data size is larger than 31 bytes, but with large overhead from established connection to send data, the data is divided into two blocks and transmitted twice using the scan request/scan response.

Next, the client sends, to the server, a connection request for establishing BLE with the server (S7020).

Accordingly, a link layer (LL) connection is established between the server and the client.

Thereafter, the server and the client perform a security establishment procedure.

The security establishment procedure may be construed as secure simple pairing or may be performed with the secure simple pairing being included therein.

In other words, the security establishment procedure may be performed through a phase 1 to a phase 3.

More specifically, a pairing procedure (i.e., the phase 1) is performed between the server and the client (S7030).

Through the pairing procedure, the client sends a pairing request to the server, and the server sends a pairing response to the client.

In the phase 2, a legacy pairing or secure connection is performed between the server and the client (S7040).

In the SSP phase 3, a key distribution procedure is performed between the server and the client (S7050).

Through the phases, a secure connection is established between the server and the client, and encrypted data may be transmitted and received.

FIG. 8 is a flowchart illustrating an example of a method for providing an object transfer service according to the BLE technology.

An object delivery service or object transfer service refers to a service supported by BLE in order to transmit/receive an object, such as bulk data or data, in Bluetooth communication.

In order to establish BLE between a server device and a client device, the advertisement process and the scanning process corresponding to steps S810 to S830 are performed.

First, the server device sends an advertisement message to the client device in order to notify the client device of information related including an object transfer service (S8010).

The advertisement message may be represented as an advertisement packet data unit (PDU), an advertisement packet, an advertisement, an advertisement frame, or an advertisement physical channel PDU.

The advertisement message may include service information (including a service name) provided by the server device, the name of the server device, and manufacturer information.

Furthermore, the advertisement message may be transmitted to the client device according to the broadcast or unicast scheme.

Thereafter, the client device sends a scan request message to the server device to find detailed information related to the server device (S8020).

The scan request message may be represented as a scanning PDU, a scan request PDU, a scan request, a scan request frame, or a scan request packet.

The server device sends a scan response message to the client device in response to the scan request message received from the client device (S8030).

The scan response message includes server device-related information requested by the client device. In this case, the server device-related information may be an object or data that may be transmitted by the server device in association with the provision of the object transfer service.

When the advertisement process and the scanning process are terminated, the server device and the client device perform an initiating connection process and a data exchange process corresponding to steps S8040 to S8070.

More specifically, the client device sends a connection request message to the server device in order to establish a Bluetooth communication connection with the server device (S8040).

The connection request message may be represented as a connection request PDU, an initiation PDU, a connection request frame, or a connection request.

Through step S8040, BLE is established between the server device and the client device. Next, the server device and the client device exchange data. During the data exchange process, the data may be transmitted and received through the data channel PDU.

The client device sends an object data request to the server device through the data channel PDU (S8050). The data channel PDU may be represented as a data request message or a data request frame.

Thereafter, the server device sends object data, requested by the client device, to the client device through the data channel PDU (S8060).

In this case, the data channel PDU is used to provide data to a corresponding device or to request information according to the scheme defined in the attribute protocol.

If data is changed in the server device, the server device sends data changed indication information to the client device through the data channel PDU in order to notify the client device of a change of the data or object (S8070).

Next, the client device requests changed object information from the server device in order to search for the changed data or changed object (S8080).

Next, the server device sends changed object information to the client device in response to the request for the changed object information (S8090).

Next, the client device searches for the changed object through a comparative analysis of the received changed object information and the object information owned by the client device.

However, the client device repeatedly performs steps S880 and S890 until the changed object or data are retrieved.

If the connected state between the host device and the client device no longer needs to be maintained, the host device or the client device may disconnect the connected state.

Overview of Isochronous Channel

FIG. 9 shows characteristics of an audio signal.

As shown in FIG. 9, in the case of an audio signal, audio streaming data or audio data is periodically generated at an idle event interval.

Audio data is generated periodically (or at a specific time interval) according to the characteristics thereof.

In this case, the specific time interval during which audio data is periodically generated may be represented as an idle event interval.

Audio data is transmitted at an individual idle event interval.

Furthermore, individual audio data may be transmitted throughout part of or the entire event interval.

As shown in FIG. 9, when audio streaming data generated periodically or regularly is transmitted according to the BLE mechanism, an advertisement and scanning procedure, a communication procedure, and a disconnection procedure have to be performed whenever the generated audio data is transmitted or received.

As shown in FIG. 9, however, since audio data is generated at a regular interval for most cases, latency needs to be guaranteed with respect to the transmission of the audio data regardless of the amount of the audio data.

If the advertisement and scanning procedure, the communication procedure, and the disconnection procedure are performed whenever newly generated audio data is transmitted, however, a latency problem occurs during the transmission of the audio data.

If the BLE technology rather than the Bluetooth BE/EDR technology is used, high energy efficiency can be achieved because a relatively small amount of audio data is transmitted through an HA or headset. As described above, however, great overhead is generated because the data channel process of the BLE technology involves advertising, connection, etc.

whenever data is transmitted. Accordingly, latency absolutely required for the transmission of audio data cannot be guaranteed.

Furthermore, the data channel process of the BLE technology involves sending intermittently generated data only when necessary, thereby improving energy efficiency by leading a BLE device in a different time region to deep sleep. Therefore, it may be difficult to apply the data channel process of the BLE technology to the transmission of audio data generated at a regular interval.

For such a reason, it is necessary to define a new mechanism in which periodically generated data, such as audio streams, is transmitted and received using the BLE technology.

Hereinafter, a method for sending and receiving data (e.g., audio data) generated at a regular interval using the BLE technology is described in detail.

In other words, a method for newly defining a channel for sending and receiving (or transceiving) data generated at a regular interval in the BLE technology, additionally defining a mechanism related to the handling of regular data without affecting energy performance of BLE, and sending data generated at a regular interval is provided below.

The phrases, such as audio streaming data, audio data, audio streaming, and audio stream used in this document, may be construed as providing the same meaning.

The term "audio data" is hereinafter used to represent the different terms, for convenience of understanding.

Isochronous Channel and Definition of a Mechanism Related to Isochronous Channel A new channel, that is, an isochronous channel, is defined to send data generated at a regular interval using the BLE technology.

An isochronous channel is used to send isochronous data to devices using isochronous streams.

Isochronous data refers to data transmitted at a particular time interval, that is, periodically or regularly.

In other words, an isochronous channel may represent a channel for sending and receiving periodically generated data, such as audio data, in the BLE technology.

An isochronous channel may be used to send and receive audio data to and from a single member, three of one or more coordinated members, or a plurality of members.

Furthermore, an isochronous channel corresponds to an isochronous stream, such as an audio stream, or a flushing channel which may be used to send and receive important data in other time regions.

Methods using an isochronous channel described later are used independently of the advertising channel and data channel defined in the existing (v4.2 or earlier) BLE technology.

Furthermore, this document additionally defines a new frequency channel and frequency hopping interval for an isochronous channel.

An isochronous channel enables a conductor to send an isochronous stream such as flushable data (e.g., time-bound audio data) to one or more members using the BLE.

In this case, the conductor may be represented as a master, and the member may be represented as a slave.

Furthermore, an isochronous channel may or may not be configured by security setting.

Furthermore, an isochronous channel may be set up for various topologies to allow the transmission of an isochronous stream between a single conductor and a member, between a single conductor and a coordinated pair of members which generates a stereo audio stream, such as hearing aids or stereo headsets, and between a single conductor and a plurality of members synchronized with the same isochronous stream(s).

In this case, the member may send data to the conductor through an isochronous channel.

Furthermore, the isochronous channel may support the transmission and reception of shared audio, public audio, and broadcast audio as well as the transmission and reception of personal audio.

A procedure for setting up an isochronous channel requires that hierarchy of profile level security and reliability requirements satisfy use cases.

Furthermore, an isochronous channel may be used for various applications, by which a plurality of audio sources and sinks may be set up, and complicated topologies may be set up to allow users to regularly change or share different audio streams.

FIG. 10 shows an example of a protocol stack of BLE which may use an isochronous channel.

Referring to FIG. 10, the protocol stack of BLE which supports an isochronous channel may be different from the protocol stack of FIG. 5.

More specifically, the protocol stack of BLE which supports an isochronous channel further includes an audio middleware layer added to the protocol stack of FIG. 5.

The audio middleware layer supports an isochronous channel for continuous data transmission and reception.

The isochronous channel includes a connection-oriented isochronous (ICO) channel for sending and receiving continuous data, that is, for point-to-point transmission, in an LE connection state and a connectionless isochronous (ICL) channel for sending and receiving continuous data, that is, for broadcast transmission, in a BLE non-connection state.

Continuous data (e.g., audio stream data) may be transmitted and received through the ICO and ICL channels of the audio middleware layer of BLE.

FIG. 11 shows an example of a home ecosystem for applications to which an isochronous channel may be applied.

In other words, FIG. 11 shows an example of the space in which a plurality of audio conductors and members to which methods according to embodiments of the present invention may be applied may move around inside/outside domains.

As shown in FIG. 11, the existence of various conductors and members indicate that an isochronous channel is required as a method for providing notification of the presence of members so that the members can obtain information necessary to form the isochronous channel.

An isochronous channel may also be used for the transmission and reception of non-audio data.

A member may use isochronous channels to determine existence of notification messages which may include acquisition information from conductors within the range of BLE communication.

Furthermore, the member may use isochronous channels to receive a request with respect to control information or service data from one or more devices acting like a remote controller.

FIG. 12 shows an example of the type of an isochronous channel.

Referring to FIG. 12, the isochronous channel may include a channel for point-to-point transmission and a channel for broadcast transmission.

More specifically, FIG. 12(a) shows connection-oriented isochronous (ICO) channels, that is, isochronous channels for point-to-point transmission. In FIG. 14(a), a master device and a slave device are connected through ICO channels, and may send and receive bi-directional data and responses thereto through the ICO channels.

The master device and the slave device may perform an LE connection (e.g., an ACL connection) in order to form and configure the ICO channels. In this case, the ACL connection and the roles of the master device and the slave device in the ICO channel are the same.

FIG. 12(b) shows connectionless isochronous (ICL) channels, that is, isochronous channels for broadcast transmission. The ICL channel is a channel for sending and receiving data in a BLE non-connection state. One or more slave devices have been synchronized with respective ICL channels from a master device in order to receive data.

The ICL channel sends one-way, but does not send a response thereto.

That is, the one or more slave devices are able to only receive data from the master device through the ICL channels, but are unable to send data to the master device through the ICL channels.

An embodiment of the present invention proposes a method for sending and receiving audio streams such an ICO channel and/or ICL channel.

FIG. 13 shows an example of operating state transition according to the BLE technology.

As shown in FIG. 13, an isochronous channel (or an ISO channel) may operate in conjunction with an advertisement channel and data channel of the BLE technology.

Referring to FIG. 13, a BLE device may change the operating state to (1) a first connected state or (2) a second connected state in which data is transmitted and received in an advertisement state.

In this case, the first connected state refers to an operating state in which the BLE device sends and receives data through a data channel, and the second connected state refers to an operating state in which the BLE device sends and receives data through an isochronous channel.

The BLE device may change its operating state to the first or second connected state depending on the type of data transmitted and received to and from devices or a data transmission type.

More specifically, the BLE device generates a data channel from an advertisement channel operating in the first connected state, and also generates an isochronous channel from an advertisement channel operating in the second connected state.

Furthermore, if the BLE device changes its operating state from the first connected state to the advertisement state, it releases a generated data channel. If the BLE device changes its operating state from the second connected state to the advertisement state, it releases a generated isochronous channel.

For example, the BLE device changes its operating state from the advertisement state to the second connected state in order to send and receive audio data. In other words, the BLE device may send and receive audio data through the isochronous channel while it is connected to the second connected state.

Furthermore, the BLE device changes its operating state from the advertisement to the first connected state in order to send and receive data generated in a random fashion or intermittently.

In other words, the BLE device may send and receive the data through the data channel in the first connected state.

As shown in FIG. 13, the BLE device makes a transition from the advertisement state to the first connected state by generating a data channel, if necessary, and sends and receives data through the generated data channel.

When the transmission and reception of the data through the data channel is completed, the BLE device closes the generated data channel and returns to the advertisement state, that is, the advertisement channel.

Likewise, the BLE device makes a transition from the advertisement state to the second connected state by generating an isochronous channel, if necessary, and sends and receives data through the generated isochronous channel.

When the transmission and reception of the data through the data channel is completed, the BLE device closes the generated isochronous channel and returns to the advertisement state, that is, the advertisement channel.

As described above, the isochronous channel is generated in order to send and receive data generated at a regular interval, such as audio data, while the data channel is generated in order to send and receive data irregularly or intermittently.

FIG. 14 illustrates various examples of isochronous stream transfer through an isochronous channel.

FIGS. 14 (a) to (d) show various topologies used to send an isochronous stream, and FIGS. 14 (a) to (d) show conductors establishing isochronous channels with the following member(s).

Two members which may receive the same or different isochronous streams (e.g., a mono stream, a joint stereo stream or separate left and right audio streams), Three groups of members, with each group synchronized to a separate isochronous stream, A single member receiving a single isochronous stream from a single isochronous channel.

A conductor establishes a plurality of isochronous channels sharing characteristics including the anchor point of the isochronous channel, by which members of a conductor may make the anchor points performed at the same time. Such isochronous streams are called an "ensemble."

A single isochronous channel which sends a single isochronous stream to a single member may not be an example of the ensemble, where such point-to-point topology may be usually described as being operated according to the unicast scheme when it is used for transmission of audio data.

Furthermore, an isochronous channel may be used to broadcast control information to one or more members, to respond to individual broadcast transmission, or to selectively request more information.

Through the operation described above, the conductor may operate in conjunction with a plurality of remote control devices. As shown in FIG. 14, a BLE device may function as a member of an isochronous channel or as the conductor of a different BLE device.

In other words, BLE devices may function as both a conductor and a member in order to establish a plurality of isochronous channels.

FIGS. 15 and 16 illustrate another example of a data transfer method using an isochronous channel.

More specifically, FIG. 15 shows an example of a unicast transmission method, and FIG. 16 shows an example of a broadcast transmission method.

First, the unicast transmission method through an isochronous channel is described with reference to FIG. 15.

In the case of the unicast transmission method, devices may operate an isochronous channel selectively for one or more unicast transmissions.

As shown in FIG. 15, a master may unicast the same or different data to a predetermined number of connected or selected slaves.

The master may generate a dual isochronous channel in order to perform bilateral communication with slaves, if necessary.

In other words, the master may form a dual isochronous channel by generating one isochronous channel along with one slave and the other isochronous channel along with the slave.

In this case, the generation of the dual isochronous channel may indicate that a downlink isochronous channel and an uplink isochronous channel are respectively generated in order to achieve bilateral communication between the master and the slave or that isochronous channels are generated between the master and two or more slaves.

Broadcast transmission through an isochronous channel is described below with reference to FIG. 16.

As shown in FIG. 16, broadcast transmission through an isochronous channel is performed according to multicast transmission differently from the broadcast transmission method used for most cases (i.e., a method for sending data to all of devices).

In other words, broadcast transmission through the isochronous channel defined in the BLE specification refers to broadcasting data only to a slave dependent to a generated isochronous channel.

In other words, the master broadcasts data only to approved slaves through an isochronous channel.

Therefore, broadcast transmission through the isochronous channel defined in the BLE specification should be construed as multicast transmission towards a specific group.

FIG. 17 shows examples of an isochronous channel packet format which may be applied to methods according to embodiments of the present invention.

The format of the isochronous channel packet transmitted through an isochronous channel is the same as that shown in FIGS. 17(*a*) and (*b*), but the present invention is not limited thereto and may have a different format.

As shown in FIG. 17(*a*), all of isochronous channels may have the packet format defined in the Bluetooth specification v4.2 supporting an isochronous data PDU of 2 to 257 octets.

FIG. 17(*a*) shows an example of an extended PDU packet format, and the extended PDU packet format 2010 includes a preamble 2011, an access address 2012, a PDU 2011, and cyclic redundancy check (CRC) 2014.

The preamble may include 1 octet, an access address of 4 octets, a PDU of 2 to 257 octets, and CRC of 3 octets.

FIG. 17(*b*) shows an example of an isochronous packet, and the isochronous packet (or isochronous channel PDU 2020) may include a header 2021 of 16 bits and payload 2022 of 0 to 255 octets.

Furthermore, the isochronous packet may include a length field of an 8 bit size, which is used to check the length of data located next to the header.

The data length of the isochronous packet varies depending on the space between isochronous channels and may be limited by a channel parameter imposed by a conductor. The isochronous packet may further include a message integrity check (MIC) field.

FIG. 18 is a diagram illustrating audio entities for audio transmission according to an embodiment of the present invention. In an embodiment of FIG. 18, each audio entity may be an entity for transmitting or setting up BLE-based audio (BLE audio) using an isochronous channel. For example, each audio entity may be audio conductors and members constituting a home echo system (or Bluetooth audio echo system) according to the embodiment of FIG. 11.

In this specification, each audio entity is a logical entity, and some or the entire entities may be included in the same physical device or different physical devices. For example, an audio source entity (audio source) and an audio controller entity (audio controller) may be included in a first physical device, and an audio sink entity (audio sink) may be included in a second physical device, different from the first physical device. A physical topology of these audio entities will be described in detail below with reference to FIG. 19.

In this specification, the term "entity" may be referred to as an element, a component, or a device. For example, an audio source entity may be referred to as an audio source device. Hereinafter, each audio entity will be described.

The audio source entity (audio source) is an entity that provides audio data. That is, an audio source may be a provider of audio streams. In an embodiment, the audio source may be an entity that provides audio data (audio stream data) using Bluetooth wireless technology. For example, the audio source may be a television, a music source, a doorbell, or public announcement that provides audio data. In an embodiment, the audio source may be controlled by at least one audio controller entity (audio controller). In this case, the audio source needs to keep the audio controller registered.

The audio sink entity (audio sink) is an entity that plays (or renders) audio received from at least one audio source. That is, the audio sink may be a consumer of audio streams. In an embodiment, the audio sink may be an entity that plays audio stream received from at least one audio source using Bluetooth wireless technology. For example, the audio sink may be a headset or a hearing aid (HA) that plays audio. In an embodiment, the audio sink may be controlled by at least one audio controller entity (audio controller). In this case, the audio sink needs to keep the audio controller registered.

The audio controller entity (audio controller) is an entity that controls at least one audio source and/or at least one audio sink. That is, the audio controller may be a main controller of audio sources and audio sinks. In an embodiment, the audio controller is an entity that controls at least one audio source and/or at least one audio sink using Bluetooth wireless technology. For example, the audio controller may be a smart phone, a smart pad, or a remote controller that controls an audio source and/or audio sink. In an embodiment, the audio controller may be a remote controller (or controller) embedded in an audio source or audio sink. For example, the audio controller may be a hardware button embedded in an audio source or audio sink.

In an embodiment, the audio controller may control services provided by an audio source and an audio sink, including the control of transport information, codec information, connectivity, mixing, and audio streams. Specifically, the audio controller may perform connection management of connection-oriented channels. Also, the audio controller may perform a function of discovering an audio sink and transmitting information, for synchronization of an audio source for a connectionless channel. Moreover, the audio controller may perform a codec parameter and/or transport parameter negotiation function. In addition, the audio controller may perform an encryption level negotiation function.

In an embodiment, the audio controller does not store any configuration data (or meta-data) of an audio source and an audio sink. Thus, the audio controller may acquire configuration data from the audio source or audio sink by sending a query for configuration data to the audio source or audio sink, if necessary. This may reduce the complexity of the audio controller.

A plurality of audio controllers may exist in a Bluetooth audio echo system according to an embodiment. In this case, an audio source or an audio sink may be connected to the plurality of audio controllers. In an embodiment, when the audio source or the audio sink is connected to a plurality of audio controllers, a hierarchy may exist between the plurality of audio controllers. That is, a plurality of audio controllers may form a hierarchical structure.

FIG. 19 shows physical topologies of audio entities according to an embodiment of the present invention. From a logical point of view, as described above with reference to FIG. 19, at least three logical entities, i.e., an audio source, an audio sink, and an audio controller, may exist in a Bluetooth audio echo system (e.g., BLE audio echo system). From a physical point of view, various physical topologies may exist depending on the position of the audio controller, as in FIG. 19, since the audio source and the audio sink comprise different physical devices.

As shown in (a) of FIG. 19, the audio controller may be located in a device separate from an audio source and an audio sink. For example, the audio controller may be a separate remote controller (e.g., smartphone) that controls an audio source (e.g., TV) and an audio sink (e.g., headset).

Moreover, as shown in (b) of FIG. 19, the audio controller may be located in an audio source. For example, the audio controller may be a hardware or software button of an audio source (e.g., MP3 player).

Moreover, as shown in (c) of FIG. 19, the audio controller may be located in an audio sink. For example, the audio controller may be a hardware or software button of an audio sink (e.g., headset).

Moreover, as shown in (d) of FIG. 19, the audio controller may be located in an audio source and an audio sink. For example, the audio controller may be a hardware or software button of an audio source (e.g., smartphone) and a hardware or software button of an audio sink (e.g., carkit).

As shown in (e) of FIG. 19, the audio controller may be located in an audio source, an audio sink, and a device separate from the audio source and the audio sink. For example, the audio controller may be a hardware or software button of an audio source (e.g., TV), a hardware or software button of an audio sink (e.g., headset), and a hardware or software button of a separate remote controller (e.g., smartphone). An embodiment of (e) of FIG. 19 may be an integrated topology that needs to be taken into consideration for BLE audio.

FIG. 20 shows multiplicity topologies of audio entities according to one embodiment of the present invention. That is, FIG. 20 shows topologies which take the multiplicity of audio entities into consideration.

Referring to (a) of FIG. 20, a Bluetooth echo system may include a plurality of audio sinks. For example, a Bluetooth echo system may include a plurality of audio sinks, such as 2/5 and 1/7 channel speakers and a headset, connected to an audio source such as a TV.

Referring to (b) of FIG. 20, a Bluetooth echo system may include a plurality of audio sources. For example, a Bluetooth echo system may include a plurality of audio sources, such as a TV, phone, and media player, connected to an audio sink such as a speaker.

Referring to (c) of FIG. 20, a Bluetooth echo system may include a plurality of audio controllers. For example, a Bluetooth echo system may include a plurality of audio controllers, such as a TV, hearing aid, and phone, that control an audio sink such as a headset (or hearing aid) and an audio source such as a TV.

Hereinafter, primary modules that perform functions of core audio middleware (or audio middleware) layer according to one embodiment of the present invention will be described. Particularly, a client-server architecture in an audio middleware layer according to one embodiment of the present invention will be described. Here, the audio middleware layer may be the audio middleware layer of the embodiment of FIG. 10.

In this specification, a server refers to an entity (or device) that provides at least one service that can be used by a plurality of clients. A client refers to an entity (or device) that uses at least one service on a server. In an embodiment, one physical device may include a plurality of clients, a plurality of servers, or a combination of clients and servers.

In this specification, a client-server architecture may comprise a server service (or server) and a client. In an embodiment, a server service may include, as an element, audio source service, audio sink service, volume service, meta-data service, codec information service, transport information service, content protection service, audio controller access service, and/or mixing service. In an embodiment, a client may include, as an element, an audio controller client and/or an audio sink client. A detailed description of this will be described below with reference to FIGS. 21 and 22.

FIG. 21 shows client-server interactions within audio entities according to one embodiment of the present invention. In FIG. 21, the arrows indicate services provided by a server that a client can access. For example, the arrows from an audio controller client to the services of an audio source indicate that the audio controller as a client can access the services provided by the audio source as a server. In another example, the arrows from an audio sink client to the audio source services of an audio source indicate that the audio sink as a client can access the audio source services provided by the audio source as a server.

In FIG. 21, M indicates that a corresponding element is mandatory, and O indicates that a corresponding element is optional. C1 indicates that a corresponding element is mandatory in a connection-oriented channel and optional in a connectionless channel. For example, the audio source service may be mandatory for the audio source entity, the transport information service may be optional for the audio source entity, the encryption service may be mandatory for the audio source entity in a connection-oriented channel and optional for the audio source entity in a connectionless channel. In this specification, the connection-oriented channel may be referred to as an ICO channel, and the connectionless channel may be referred to as an ICL channel.

Referring to FIG. 21, the services provided by the audio source entity include audio source service, meta-data service, transport information service, codec information service, mixing service, audio controller access service, encryption service, and/or volume service.

Also, the services provided by the audio sink entity include audio source service, meta-data service, transport information service, codec information service, mixing service, audio controller access service, encryption service, and/or volume service. In an embodiment, an audio sink may operate as a client for the audio source. That is, the audio sink, as a client, may access the audio source services provided by the audio source.

Moreover, the audio controller entity, as a client, may access the services provided by the audio source or audio sink, as a server. That is, the audio controller entity may only exist as a client.

FIG. 22 is a table of definitions of service/client characteristics according to one embodiment of the present invention. In FIG. 22, services may refer to services provided by the above-described server (e.g., audio source or audio sink).

Referring to FIG. 22, services include audio source service, meta-data service, transport information service, codec information service, mixing service, audio controller access service, encryption service, and/or volume service.

In an embodiment, the audio source service provides an interface (e.g., start, stop, suspend, and resume) for audio streaming and can be controlled by commands sent by an audio controller. Moreover, the audio source service may send advertising information related to audio streams (e.g., codec information, meta-data, source stream parameters, etc.). In an embodiment, the audio source service may be mandatory for the audio source entity.

In an embodiment, the audio sink service may provide an interface for synchronization of streams served by an audio source. Moreover, the audio sink service may render (or play) audio streams. In addition, the audio sink service may send advertising information related to the presence of an audio sink. In an embodiment, the audio sink service may be mandatory for the audio sink entity.

In an embodiment, the meta-data service may provide meta-data related to audio streams. For example, the meta-data service may provide meta-data such as channel information, stream information, bitrate, codec, sampling rate, audio source information, audio sink information, language, stream ID, number of channels, and/or application type (e.g., alarm, public announcement, phone call, music, video, and advertisement). In an embodiment, the meta-data service may be mandatory for the audio source entity. In an embodiment, the meta-data service may be provided only by the audio source entity.

In an embodiment, the audio controller access service may provide an interface for registering one or more audio controller clients and keeping them registered. Moreover, the audio controller access service may provide access control. Access control may prevent access from unauthorized audio controller clients. In addition, an audio controller client may use the services provided by an audio source and audio sink after registration. Further, the audio controller access service may allow for acquisition of audio streaming information from an audio source. In an embodiment, the audio controller access service may be mandatory for the audio source entity and the audio sink entity.

In an embodiment, the code information service may provide an interface for sending a query for a list of supported codecs. In an embodiment, the audio controller client may send a query for code information to an audio source and an audio sink and then negotiate on the codec information and perform matching. In an embodiment, the code information service may be optional for the audio source entity and the audio sink entity.

In an embodiment, the transport information service may provide an interface for getting transport parameters. In an embodiment, an audio source and an audio sink may support this service. In this case, the audio controller client may send a query for transport information to the audio source and the audio sink and then negotiate on the transport information and perform matching. In an embodiment, the transport information service may be optional for the audio source entity and the audio sink entity.

In an embodiment, the mixing service may provide a feature for mixing audio channels into one channel. This service may be provided by an audio source and an audio sink. In an embodiment, the mixing service may be optional for the audio source entity and the audio sink entity.

In an embodiment, the volume service may provide a volume up/down feature. This service may be provided by an audio source and an audio sink. In an embodiment, the volume service may be optional for the audio source entity and the audio sink entity.

Referring to FIG. 22, a client may include an audio controller client and/or an audio sink client.

In an embodiment, the audio controller client may use all services supported by an audio source and an audio sink. The audio controller client may be located in an audio controller entity. The audio controller entity may reside (or be located) in an audio source device (or entity), audio sink device (or entity), or a dedicated, separate remote controller.

In an embodiment, the audio sink client may obtain audio streaming information from an audio controller. Moreover, the audio sink client may synchronize audio streaming information from an audio source in order to receive audio stream data. In addition, the audio sink client may be located in an audio sink.

FIG. 23 shows service usage architectures in respective entities according to one embodiment of the present invention. Specifically, (a) of FIG. 23 shows service-to-terminology mapping according to one embodiment of the present invention, and (b) of FIG. 23 shows service mapping within a client-server architecture according to one embodiment of the present invention.

Referring to (a) of FIG. 23, an audio source may be implemented as a server that provides service to audio-A, audio-C, and audio-S. An audio sink may be implemented as a server that provides service to audio-A and audio-C. An audio controller may be implemented as a client for audio-A and audio-C.

Here, audio-A is an audio link that supports advertising and announcement of audio data. Audio-C is an audio link that supports control and configuration of audio data to be transmitted. Audio-S is an audio link that supports transmission of audio streams.

In an embodiment, a service for audio-A may be a service (e.g., audio source service or audio sink service) provided via the audio-A link that supports advertising and announcement of audio data, a service for audio-C may be a service (e.g., audio source service or audio sink service) provided via the audio-C link that supports control and configuration of audio data to be transmitted, and a service for audio-S may be a service (e.g., audio source service) provided via the audio-S link that supports transmission of audio streams.

(b) of FIG. 23 demonstrates which entity operates as a server for a particular service and what entity operates as a client that can access this particular service.

For example, in the case of the audio source service for audio-A, the audio source operates as a server, and the audio controller operates as a client. In the case of the audio source service for audio-C, the audio source operates as a server, and the audio controller operates as a client. In the case of the audio source service for audio-S, the audio source operates as a server, and the audio sink operates as a client.

In another example, in the case of the audio sink service for audio-A or audio-C, the audio sink operates as a server, and the audio controller operates as a client.

In still another example, in the case of the meta-data service, the audio source operates as a server, and the audio controller operates as a client. Moreover, in the case of the transport information service, codec information service, audio controller control service, or volume service, the audio source or the audio sink operates as a server, and the audio controller operates as a client.

In a further example, in the case of the encryption service, which is a type of content protection service, the audio source operates as a server, and the audio controller operates as a client.

For example, in the case of the meta-data service, the audio source operates as a server that provides this service, and the audio controller operates as a client that can access this service. In this embodiment, it can be found out that the audio sink is not related to the meta-data service.

FIG. 24 is a flowchart illustrating an example of a method for sending and receiving audio streams through an LE connection to which a method proposed in this specification may be applied.

Referring to FIG. 24, the first device 200 that is a slave device, may establish an LE connection with the second device 300 that is a master device, may generate an isochronous channel, and may receive audio stream data through the isochronous channel.

A detailed procedure for receiving audio stream data through an LE connection is described in detail below.

LE Connection Establishment Procedure S24010

The first device 200 may perform an LE connection establishment procedure with the second device 300 in order to receive audio stream data from the second device 300.

In this case, the LE connection establishment procedure may be performed through the method described with reference to FIG. 7.

Service Level Connection Establishment Procedure S24020

After establishing an LE connection with the second device 300, the first device 200 may perform a service level connection establishment procedure.

The service level connection establishment procedure may be performed due to a reason similar to that of the service level connection establishment procedure described with reference to FIG. 10 or 21.

For example, the first device 200 may perform state synchronization through the service level connection establishment procedure, and may open a control channel (i.e., a second channel) in order to control an isochronous channel (i.e., a first channel) for sending and receiving audio stream data.

In this case, the control channel may be one of BLE data channels.

If the first device 200 is divided into a left device and a right device like a headset, the state synchronization means that synchronization is performed between the left device and the right device and may be performed through the GATT message of BLE.

After opening the control channel, the first device 200 may perform a codec & transport parameter negotiation procedure along with the second device 300 (S24030).

Codec & Transport Parameter Negotiation Procedure S24030

The first device 200 may determine audio stream data and parameters related to the transmission and reception of the audio stream data through a codec parameter and transport parameter negotiation procedure along with the second device 300.

More specifically, the first device 200 may send a supported codec parameter and transport parameter to the second device 300.

The codec parameter may include a codec name (or a codec type), a sample rate indicative of a total number of samples extracted during 1 second, a bit depth indicative of the potential precision of hardware or software which processes audio data in digital audio, a bit rate, a frame length, and audio channel information (e.g., mono, stereo, or dual mode).

The transport parameter may include maximum transport latency, the number of audio streams, and an encryption level.

Thereafter, the first device 200 may receive a codec parameter and transport parameter, supported by the second device, from the second device 300 and select proper parameters of common parameters.

In an embodiment, the second device 300 may select proper parameters of the received codec parameter and transport parameter and send the selected parameters to the first device 200.

In an embodiment, the second device 300 may send a supported codec parameter and transport parameter to the first device 200. The first device 200 may select proper parameters of the received parameters and send them to the second device 300.

Isochronous Connection Establishment Procedure S24040

After selecting proper parameters through the codec & transport parameter negotiation procedure, the first device 200 and the second device 300 may perform an isochronous connection establishment procedure.

Through the isochronous connection establishment procedure, the first device 200 may form an audio stream along with the second device 300 and may open an isochronous channel for sending and receiving the formed audio stream.

In this case, the type (i.e., ICO or ICL) of the isochronous channel, a channel ID (CID), a channel map, a connection interval, latency, a channel count, and a retransmission count may be determined through the isochronous connection establishment procedure.

Audio Stream Connection Establishment Procedure S24050

The first device 200 that has opened the isochronous channel may perform an audio stream connection establishment procedure along with the second device 300.

The audio stream connection establishment procedure is a procedure for sending and receiving the formed audio stream. The first device 200 may configure (or assign) a role for sending and receiving the formed audio stream to and from the second device 300 through the audio stream connection establishment procedure.

Furthermore, state synchronization may be performed between the first device 200 and the second device 300. The first device 200 and the second device 300 may open an audio link for sending and receiving the formed audio stream.

Thereafter, the first device 200 may receive an audio stream from the second device 300 and output the received audio stream to the outside through the output unit.

Through such a method, the first device 200 may determine proper parameters for sending, receiving, and playing back audio streams along with the second device 300, and may provide an audio streaming service through the determined parameters.

FIG. 25 is a flowchart illustrating another example of a method for sending and receiving audio streams through an LE connection to which a method proposed in this specification may be applied.

Referring to FIG. 25, unlike in the example of FIG. 24, a service level connection establishment procedure may not be performed, but state synchronization may be performed in an audio stream connection establishment procedure.

More specifically, the first device 200 may perform an LE connection establishment procedure along with the second device 300 in order to receive audio stream data from the second device 300 (S25010).

In this case, the LE connection establishment procedure may be performed through the method described with reference to FIG. 7.

The first device 200 may open a control channel in order to control an isochronous channel for sending and receiving audio stream data to and from the second device 300.

Thereafter, step S25020 and step S25030 are the same as step S24030 and step S24040 of FIG. 24, and a description thereof is omitted.

The first device 200 that has opened the isochronous channel may perform an audio stream connection establishment procedure along with the second device 300 (S25040).

The audio stream connection establishment procedure is a procedure for sending and receiving the formed audio stream. The first device 200 may configure (or assign) a role for sending and receiving the formed audio stream to and from the second device 300 through the audio stream connection establishment procedure.

Furthermore, state synchronization may be performed between the first device 200 and the second device 300. The first device 200 and the second device 300 may perform the state synchronization described at step S24020 of FIG. 24 through the GATT message.

Furthermore, the first device 200 and the second device 300 may open an audio link for sending and receiving the audio stream.

Thereafter, the first device 200 may receive an audio stream from the second device 300 and output the received audio stream to the outside through the output unit.

FIG. 26 is a flowchart illustrating a method of establishing a BLE connection according to an embodiment of the present invention. Particularly, FIG. 26 illustrates an example of a method of establishing (setting) a BLE connection for providing a service including audio data using BLE technology. In FIG. 26, a detailed description corresponding to that described with reference to FIG. 7 will be omitted.

Referring to FIG. 26, the BLE connection establishment step includes step S26100 of establishing a BLE connection between the audio sink and the audio controller and step S26200 of establishing a BLE connection between the audio source and the audio controller or the audio sink. That is, at the BLE connection establishment step, the audio source, the audio sink, and the audio controller each establish a BLE connection therebetween, thereby establishing a BLE connection. Hereinafter, each step will be described in detail.

First, step S26100 of establishing a BLE connection between the audio sink and the audio controller will be described. In the embodiment, the audio sink may operate as a server, and the audio controller may operate as a client. In this case, the audio sink may transmit advertisement message through an advertisement channel. The audio controller may transmit a connection request for establishing a BLE connection with the audio sink in response to the received advertisement message. Thereby, a BLE connection may be established between the audio sink and the audio controller.

Thereafter, step S26200 of establishing a BLE connection between the audio source and the audio controller or the audio sink will be described. In the embodiment, the audio source may operate as a server, and the audio controller and the audio sink may operate as a client. In this way, the audio sink may operate as a client upon establishing a BLE connection with the audio sink and may operate as a source upon establishing a BLE connection with the audio controller.

In this case, the audio sink may transmit advertisement message through an advertisement channel. The audio controller may transmit a connection request for establishing a BLE connection with the audio source in response to the received advertisement message. Further, the audio sink may transmit a connection request for establishing a BLE connection with the audio source in response to the received advertisement message. Thereby, a BLE connection may be each established between the audio source and the audio controller or the audio sink.

FIG. 27 is a flowchart showing a method of registering an audio controller according to one embodiment of the present invention. Particularly, FIG. 27 shows an embodiment of a method in which an audio controller for controlling an audio source and an audio sink is registered by sending a registration request message to the audio source and the audio sink from the audio controller once a BLE connection is established.

Referring to FIG. 27, the audio controller registration method may include a procedure of establishing a BLE connection for an audio source, an audio sink, and an audio controller (S27100). In this case, the BLE connection establishment procedure may be performed by the above-described method with reference to FIGS. 7 and 24.

Moreover, the audio controller registration method may include a control path opening procedure (S27200). Specifically, the audio controller may perform a procedure of opening a control path (or channel) for the audio source and/or audio sink. Here, the control channel is one of data channels for BLE audio, and may be a data channel (or link) for transmitting control information (or data) for control and configuration of audio data.

In an embodiment, the audio controller may open a control channel for the audio source and audio sink by registering itself as a remote controller for the audio source and audio sink. For example, the audio controller may register itself as a remote controller for the audio source by sending a register RC message to the audio source and receiving a response message from the audio source as a response to the register RC message. In another example, the audio controller may register itself as a remote controller for the audio sink by sending a register RC message to the audio sink and receiving a response message from the audio sink as a response to the register RC message. By this, the audio controller may open a control channel for the audio source and audio sink and control the audio source and the audio sink via the control channel.

FIG. 28 is a flowchart showing a method of deregistering an audio controller according to one embodiment of the present invention. Particularly, FIG. 28 shows an embodiment of a method in which an audio controller for controlling an audio source and an audio sink is deregistered by sending a deregistration message to the audio source and the audio sink from the audio controller while a control path is opened after a BLE connection establishment procedure S28100 and/or control path establishment procedure S28200 is performed. In this case, the BLE connection establishment procedure S28100 may be performed by the above-described method with reference to FIGS. 7 and 24. The control path establishment procedure S28200 also may be performed by the above-described method with reference to FIGS. 7 and 24.

Referring to FIG. 28, the audio controller deregistration method may include a control path closing procedure (S28300). Specifically, the audio controller may perform a procedure of closing a control path (or channel) for the audio source and/or audio sink. Here, the control channel is one of data channels for BLE audio, and may be a data channel (or link) for transmitting control information (or data) for control and configuration of audio data.

In an embodiment, the audio controller may close a control channel for the audio source and audio sink by deregistering itself as a remote controller for the audio source and audio sink. For example, the audio controller may register itself as a remote controller for the audio source by sending a deregister RC message to the audio source and receiving a response message from the audio source as a response to the deregister RC message. In another example, the audio controller may deregister itself as a remote controller for the audio sink by sending a deregister RC message to the audio sink and receiving a response message from the audio sink as a response to the deregister RC message. By this, the audio controller may close a control channel for the audio source and audio sink.

In an embodiment, if the audio source or the audio sink moves beyond a preset range, the audio controller may perform the above-described control path closing procedure. In this case, the BLE connection may be released based on a connection timeout setting. For example, if a preset connection timeout period is up, the BLE connection may be released. Afterwards, if the audio sink or the audio moves back into the preset range, the audio controller may perform the BLE connection and control path opening procedures again.

FIG. 29 shows a codec and transport negotiation procedure according to one embodiment of the present invention. Specifically, FIG. 29 shows a first embodiment of a codec and transport negotiation procedure for a connection-oriented channel (e.g., ICO channel). In the embodiment of FIG. 29, a control channel may be a data channel.

FIG. 29 shows message types an audio controller transmits and receives to and from an audio source or audio sink according to one embodiment of the present invention. Specifically, FIG. 29 shows message types an audio controller transmits and receives to and from an audio source or audio sink after the audio controller is registered.

Referring to FIG. 29, an audio controller may control an audio source or audio sink by transmitting a control command (or control message) to the audio source or audio sink. Also, the audio controller may receive a response message to the control message from the audio source or audio sink. Also, the audio controller may receive an event message or indication message from the audio source or audio sink. The event message may contain information on an event created by the audio source or audio sink. The indication message may contain indication information from the audio source or audio sink.

FIG. 30 shows an audio stream provision method according to one embodiment of the present invention. Specifically, FIG. 30 shows a method of providing an audio stream under control of an audio controller, after a BLE connection establishment procedure and a control path opening procedure are performed according to FIGS. 24 and 25.

Referring to FIG. 30, the audio stream provision method may include a control procedure. Specifically, an audio controller may perform a procedure of controlling an audio source or audio sink. In an embodiment, the audio controller may control the audio source or audio sink by transmitting a control command (message) to the audio source or audio sink over a control channel. In this case, the audio source or audio sink may perform a corresponding operation based on the control message, and transmit a corresponding response message to the audio controller. In this specification, the control message may be referred to as an audio stream command (CMD).

In an embodiment, the audio controller may control the audio source by transmitting a first control message to the audio source. For example, the audio controller may control the audio source by transmitting a first control message (e.g., streaming execution message) for a service (e.g., audio streaming service) provided by the audio source. In this case, the first control message may contain information (e.g., address information of a streaming server for executing streaming) related to a service.

Afterwards, the audio source may perform a corresponding operation (e.g., execution of streaming) based on a first control message and transmit a first response message to the audio controller. In this case, the first response message may contain information (e.g., audio stream ID information) for receiving an audio stream provided by the audio source. In an embodiment, the audio stream ID information may be associated with information on a channel over which the corresponding audio stream is transmitted.

In an embodiment, the audio controller may control the audio sink by transmitting a second control message to the audio sink. For example, the audio controller may control the audio sink by transmitting a second control message (e.g., audio playback start message) for a service (e.g., audio playback service) provided by the audio sink. In an embodiment, the second control message may be a message containing the audio stream ID information contained in the first response message. By this, the audio sink may get information required to receive an audio stream provided by the audio source.

Afterwards, the audio sink may perform a corresponding operation (e.g., audio playback start) based on the second control message and transmit a second response message to the audio controller. In this case, the second response message may contain information on whether the operation corresponding to the second control message is successful or not.

In this way, the audio controller may control the audio source and the audio sink by transmitting a first control message to the audio source, receiving a first response message to the first control message from the audio source, generating a second control message based on the first response message and transmitting it to the audio sink, and receiving a second response message to the second control message from the audio source. By this, the audio controller may control the establishment of a transport path for audio stream transmission between the audio source and the audio sink.

In an embodiment, a procedure of establishing a transport path for audio stream transmission may be performed by at least either the isochronous connection establishment procedure or audio stream connection establishment procedure described above with reference to FIG. 24 or FIG. 25.

Further, the audio stream provision method may include an audio stream transmission/reception procedure. In an embodiment, the audio sink may receive an audio stream provided by the audio source based on the second control message. For example, the audio sink may receive an audio stream from a channel over which the corresponding audio stream is received, based on the audio stream ID information contained in the second control message. Afterwards, the audio sink may play (or render) the received audio stream.

FIG. 31 shows an audio stream provision method according to another embodiment of the present invention. Specifically, FIG. 31 shows a method in which an audio sink plays an audio stream under control of an audio controller, when an audio source transmits the audio stream through broadcast or public announcement.

Referring to FIG. 31, before the transmission of an audio stream, a BLE connection establishment procedure and a control path opening procedure may be performed between an audio controller and an audio sink. By this, the audio controller may be registered on the audio sink. In the embodiment of FIG. 31, the control path opening procedure is not performed between the audio controller and an audio source since the audio source transmits the audio stream through broadcast or public announcement. That is, there is no need to register the audio controller on the audio source.

The audio source may transmit an advertising message. In an embodiment, the advertising message may contain audio source information. For example, the advertising message may contain at least one among the audio stream's identification information (e.g., audio stream ID information), language information, synchronization information, transport parameter information, and codec parameter information. In an embodiment, the identification information may be a universally unique identifier (UUID) information for the audio stream provided by the audio source.

If the audio controller receives an advertising message from the audio source after the audio controller is registered on the audio sink, the audio controller may generate a control message for the audio sink based on the advertising message. For example, the audio controller may generate a control message related to the reception of an audio stream based on the advertising message. In an embodiment, the control message may contain stream ID information for an audio stream provided by the audio source. By this, the audio sink may receive an audio stream from the audio source.

Hereinafter, requirements that need to be considered when a plurality of audio controllers (or remote controllers) exist in an audio topology will be described with reference to FIGS. 32 to 34.

First of all, from the point of view of an audio controller, when a plurality of audio controllers exist in an audio topology, it is necessary to take into account which audio source(s) or audio sink(s) need to be connected (or recognized) by the audio controller. In an embodiment, the audio controller may receive an audio-A message, and be connected to an audio source or sink entity within coverage.

Next, from the point of view of an audio source/sink, when a plurality of audio controllers exist in an audio topology, it is necessary to take into account how to simultaneously select appropriate messages transmitted by the plurality of audio controllers. In an embodiment, appropriate messages may be selected by the audio source or audio sink according to priority.

FIG. 32 shows a table of access levels to an audio controller according to one embodiment of the present invention. By defining a table (or information) of access levels to an audio controller, as in the embodiment of FIG. 32, the audio source and the audio sink may check the priority of a control message transmitted by an audio controller(s). In an embodiment, the access level information may be used when the audio controller is registered in the audio source or audio sink.

Referring to FIG. 32, the audio controller may have three access levels. First, Full level, which is the highest priority, may allow for exclusive access permission and user level permission. Normal level, which is the next highest priority, may allow for user level permission. Limited level, which is the lowest priority, may allow for limited user level permission.

Here, exclusive access permission is the highest priority, in which case no other control messages transmitted by other audio controllers, other than the control message transmitted by the corresponding audio controller, may be discarded. User level permission refers to permitting an audio controller to use all services provided by a server. Limited user level permission refers to permitting an audio controller to use only services transmitted through broadcast (not controlled by the audio controller).

FIG. 33 is a conceptual diagram showing access from an audio controller to an audio source or audio sink according to one embodiment of the present invention.

In an embodiment, access from an audio controller to service(s) provided by an audio source tend to focus on unicast/broadcast. Also, access from the audio controller to service(s) provided by an audio sink tend to focus on use case environments (e.g., personal/shared/public).

Referring to the left table of FIG. 33, an audio source (e.g., music source, or TV) transmitting an audio stream through unicast may have Full level for the audio controller. An audio source (e.g., music source, TV, or doorbell) transmitting an audio stream by secure broadcast may have Normal level for the audio controller. In this case, there may be other remote controllers having exclusive access. An audio source transmitting an audio stream (e.g., smoke alarm, public announcement, commercial advertisement) through broadcast may have Limited level for the audio controller.

Referring to the right table of FIG. 33, an audio sink (e.g., hearing aid, headset, or speaker(s)) providing an audio stream in a personal environment may have Full level for the audio controller. An audio sink (e.g., party mode speaker(s)) providing an audio stream in a shared environment may have Normal level for the audio controller. In this case, there may be other remote controllers having exclusive access. In the case of an audio sink (e.g., dedicated speaker) providing an audio stream in a public environment, there is no need to take the level for the audio controller into account.

FIG. 34 is a table showing exclusive or non-exclusive access from an audio controller to an audio source or audio sink according to one embodiment of the present invention. In an embodiment, exclusive or non-exclusive access from an audio controller to an audio source or audio sink may be used only in a personal or shared environment.

Referring to FIG. 34, in a personal environment, exclusive access may be permitted or not, and non-exclusive access may be permitted. In this case, the audio topology may have a dedicated audio controller. For example, if exclusive access is permitted, the audio topology may have a dedicated audio controller, and if exclusive access is not permitted, the audio topology may have no dedicated audio controller.

In a shared environment, exclusive access may be permitted, and non-exclusive access may not be permitted. In this case, the audio topology needs a dedicated audio controller.

FIG. 35 shows a method of transmitting and receiving data according to one embodiment of the present invention. Particularly, FIG. 35 shows a method for a first device to transmit and receive data using Bluetooth Low Energy technology.

Here, the first device refers to a device (or entity) that controls at least one device using BLE technology. For example, the first device may be an audio controller that controls at least one audio source and/or at least one audio sink. Here, the audio source is a device (or entity) that provides audio streams, and may be referred to as a second device. The audio sink is a device (or entity) that consumes audio streams received from at least one audio source, and may be referred to as a third device.

As described above, entities including an audio controller entity as the first device, an audio source entity as the second device, and an audio sink entity as the third device are logical entities, and some or the entire entities may be included in the same physical device or different physical devices. For example, the audio source and the audio controller may be included in a first physical device, and the audio sink may be included in a second physical device, different from the first physical device.

Moreover, each of the above-described devices or entities may comprise a communication part (communication module) for communicating with the outside or inside in a wired or wireless manner.

The first device may establish a Bluetooth LE connection with at least one device (S35100). For example, the first device may establish a Bluetooth LE connection with the second device and/or third device. A method of establishing a BLE connection among the first device, second device, and third device is as described with reference to FIG. 26, so a detailed description thereof will be omitted.

The first device may open a control path for at least one device (S35200). The first device may open a control path for the second device and/or third device. In an embodiment, the first device may open a control path by sending to each of the second and third devices a registration request message asking for its registration as a remote controller and receiving a response message to the registration request message from each of the second and third devices—a description of which has been given above with reference FIG. 28, so redundant description will be omitted.

The first device may transmit a control message associated with audio streaming to the at least one device via the control path. (S35300).

In an embodiment, if the second device transmits the audio stream through broadcast, the at least one device may correspond to the third device. That is, the first device may establish a BLE connection with the third device and establish a control path for the third device. In this case, after the step of establishing a control path, the first device may receive an advertising message containing audio source information from the second device. Upon receiving the advertising message, the first device may transmit the control message to the third device. In an embodiment, the control message may be generated based on the audio source information contained in the advertising message. In an embodiment, the audio source information may include at least one among the audio stream's identification information, language information, synchronization information, transport information, and codec information.

In another embodiment, the step of establishing a Bluetooth LE connection may include the step of establishing a Bluetooth LE connection with the second device and the third device. Further, the step of opening a control path may include the step of opening a control path for the second device and third device. Further, the step of transmitting the control message to the at least one device may include the steps of: transmitting to the second device a first control message associated with the transmission of the audio stream; and transmitting to the third device a second control message associated with the reception of the audio stream. In an embodiment, the second control message may be generated based on a response message received from the second device as a response to the first control message.

In an embodiment, the second control message may contain audio stream identification information for identifying the audio stream transmitted by the second device.

Each step described in the foregoing embodiment may be performed by hardware/processors. Each module/block/unit described in the foregoing embodiment may operate as hardware/processor. Further, methods suggested by the present invention may be executed as a code. The code may be recorded in a processor readable storage medium and may be thus read by a processor provided by an apparatus.

For convenience of description, embodiments are divided and described with reference to each drawing, but embodiments described with reference to each drawing may be combined to implement a new embodiment. A configuration and method of the foregoing embodiments are not limitedly applied to an apparatus and method according to the present invention but for various changes of the foregoing embodiments, the entire or some of each embodiment may be selectively combined.

A method suggested by the present invention may be implemented into a processor readable code in a processor readable recording medium provided in a network device. A processor readable recording medium includes an entire kind of record device that stores data that may be read by a processor. The processor readable recording medium may include, for example, a read-only memory (ROM), a random-access memory (RAM), a CD-ROM, a magnetic tape, a floppy disk, and an optical data storage apparatus and includes implementation in a form of a carrier wave such as transmission through Internet. Further, the processor readable recording medium is distributed in a computer system connected to a network, and a processor readable code may be stored and executed with a distributed method.

Further, in the foregoing description, embodiments of the present invention are described, but the present invention is not limited to the foregoing specific embodiment and changes and variations may be made by those having ordinary skill in the art without departing from the spirit or scope of the following claims and all such changes, modifications and alterations should therefore be seen as within the scope of the present invention.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

In this specification, the entire of apparatus and method inventions are described and a description of the entire of apparatus and method inventions may be complementarily applied.

What is claimed is:

1. A method in which a first device transmits and receives data to and from a second device and a third device using Bluetooth Low Energy (BLE) technology in a wireless communication system, the second device being a device that transmits an audio stream, and the third device being a device that receives the audio stream, the method comprising:

establishing a BLE connection with the third device;
opening a control path with the third device for sending control information related to the audio stream;

receiving an advertising message including audio source information from the second device in a disconnected state with the second device,
wherein the audio source information includes universally unique identifier (UUID) information of the audio stream provided by the second device;
transmitting a control message associated with the audio stream to the third device via the control path;
closing the control path when the third device has moved out of a predetermined range; and
releasing the BLE connection after a predetermined connection timeout period elapses,
wherein the control message is generated based on the audio source information,
wherein the opening of the control path comprises:
  sending a registration request message to the third device for registering the first device as a remote controller; and
  receiving a response message from the third device in response to the registration request message,
wherein the response message includes an access level information indicating a priority regarding control of the third device by the first device, and
wherein the control message is processed in the third device based on the access level information.

2. A first device which transmits and receives data to and from a second device and a third device using Bluetooth Low Energy (BLE) technology, the second device being a device that transmits an audio stream, and the third device being a device that receives the audio stream, the first device comprising:
  a communication part; and
  a processor functionally connected to the communication part,
wherein the processor is further configured to:
establish a BLE connection with the third device,
open a control path with the third device for sending control information related to the audio stream,
control the communication part to receive an advertising message including audio source information from the second device in disconnected state with the second device,
wherein the audio source information includes universally unique identifier (UUID) information of the audio stream provided by the second device,
control the communication part to transmit a control message associated with the audio stream to the third device via the control path,
close the control path when the third device has moved out of a predetermined range, and
release the BLE connection after a predetermined connection timeout period elapses,
wherein the control message is generated based on the audio source information,
wherein the processor opens the control path by controlling the communication part to send a registration request message to the third device for registering the first device as a remote controller, and receive a response message from the third device in response to the registration request message,
wherein the response message includes an access level information indicating a priority regarding control of the third device by the first device, and wherein the control message is processed in the third device based on the access level information.

* * * * *